(12) United States Patent
Yamada et al.

(10) Patent No.: US 8,165,537 B2
(45) Date of Patent: Apr. 24, 2012

(54) WIRELESS TRANSMITTER AND WIRELESS TRANSMISSION METHOD

(75) Inventors: Ryota Yamada, Chiba (JP); Kimihiko Imamura, Vancouver, WA (US)

(73) Assignee: Sharp Kabushiki Kaisha, Osaka (JP)

( * ) Notice: Subject to any disclaimer, the term of this patent is extended or adjusted under 35 U.S.C. 154(b) by 974 days.

(21) Appl. No.: 12/159,075

(22) PCT Filed: Dec. 20, 2006

(86) PCT No.: PCT/JP2006/325358
§ 371 (c)(1),
(2), (4) Date: Jun. 24, 2008

(87) PCT Pub. No.: WO2007/077736
PCT Pub. Date: Jul. 12, 2007

(65) Prior Publication Data
US 2009/0268686 A1  Oct. 29, 2009

(30) Foreign Application Priority Data

Dec. 26, 2005 (JP) ................................. 2005-371336

(51) Int. Cl.
*H04B 1/04* (2006.01)

(52) U.S. Cl. .................. 455/103; 455/115.1; 455/115.2; 455/115.3; 455/226.1; 455/226.2; 370/395.4

(58) Field of Classification Search .................. 455/103, 455/522, 115.1, 226.1, 226.2, 115.2, 115.3; 370/395.4
See application file for complete search history.

(56) References Cited

U.S. PATENT DOCUMENTS

| | | | |
|---|---|---|---|
| 5,991,331 A | 11/1999 | Chennakeshu et al. | |
| 6,034,987 A | 3/2000 | Chennakeshu et al. | |
| 6,131,016 A | 10/2000 | Greenstein et al. | |
| 6,650,910 B1 | 11/2003 | Mazur et al. | |
| 6,807,145 B1 | 10/2004 | Weerackody et al. | |
| 6,826,169 B1 * | 11/2004 | Nagatani et al. | 370/342 |
| 6,842,487 B1 | 1/2005 | Larsson | |
| 6,980,612 B1 | 12/2005 | Miyoshi | |
| 7,002,939 B1 | 2/2006 | Hiramatsu | |
| 7,277,469 B2 | 10/2007 | Brunel | |
| 7,298,797 B2 | 11/2007 | Hwang et al. | |

(Continued)

FOREIGN PATENT DOCUMENTS

CN 1320308 A 10/2001

(Continued)

OTHER PUBLICATIONS

Office Action dated Dec. 16, 2010 for U.S. Appl. No. 12/773,684.

(Continued)

*Primary Examiner* — Sanh Phu
(74) *Attorney, Agent, or Firm* — Birch, Stewart, Kolasch & Birch, LLP

(57) ABSTRACT

A wireless transmitter of the present invention includes n (n being an integer of 2 or more) transmission antennas, a transmission circuit controller that, based on reception qualities reported from terminals, assigns a chunk to each terminal, and sends a phase-control report signal that determines whether to perform phase-control, to that chunk, and a transmission circuit unit that, to each of the n transmission antennas, performs phase-control based on the phase-control report signal, and applies a delay that obtains an optimum transmission diversity effect among a plurality of transmission diversity effects.

21 Claims, 31 Drawing Sheets

U.S. PATENT DOCUMENTS

| | | | |
|---|---|---|---|
| 7,397,804 B2 * | 7/2008 | Dulin et al. | 370/395.4 |
| 7,436,903 B2 | 10/2008 | Sandhu et al. | |
| 7,672,388 B2 | 3/2010 | Frank | |
| 7,742,533 B2 | 6/2010 | Aoki et al. | |
| 2002/0186785 A1 | 12/2002 | Hoshino et al. | |
| 2003/0169682 A1 | 9/2003 | Chen et al. | |
| 2004/0235433 A1 | 11/2004 | Hugl et al. | |
| 2004/0235512 A1 * | 11/2004 | Kiiski et al. | 455/522 |
| 2005/0048933 A1 | 3/2005 | Wu et al. | |
| 2005/0201268 A1 | 9/2005 | Aoki et al. | |
| 2005/0220199 A1 | 10/2005 | Sadowsky et al. | |
| 2005/0281240 A1 | 12/2005 | Oh et al. | |
| 2006/0013186 A1 | 1/2006 | Agrawal et al. | |
| 2006/0120473 A1 | 6/2006 | Baum | |
| 2006/0239226 A1 | 10/2006 | Khan | |
| 2006/0274854 A1 | 12/2006 | Matsumoto et al. | |
| 2007/0008946 A1 | 1/2007 | Kim | |
| 2009/0081967 A1 | 3/2009 | Imamura | |
| 2009/0135940 A1 | 5/2009 | Imamura | |

FOREIGN PATENT DOCUMENTS

| | | |
|---|---|---|
| CN | 1338162 A | 2/2002 |
| EP | 1 578 043 A1 | 9/2005 |
| GB | 2392584 A | 3/2004 |
| JP | 2004-208234 A | 7/2004 |
| WO | WO 01/54305 A1 | 7/2001 |
| WO | WO 02/07341 A2 | 1/2002 |
| WO | WO 2005/117321 A1 | 12/2005 |
| WO | WO-2007/026882 A1 | 3/2007 |

OTHER PUBLICATIONS

Office Action dated Jan. 18, 2011 for U.S. Appl. No. 12/692,986.
Office Action dated Jan. 21, 2011 for U.S. Appl. No. 12/547,238.
"Physical Channels and Multiplexing in Evolved UTRA Downlink", NTT, R1-050707, 3GPP TSG RAN WG1 Meeting #42 on LTE, Aug. 29, 2005, London, UK.
"Some Aspects of Single-Carrier Transmission for E-UTRA", 3GPP TSG RAN WG1 Meeting #42, Ericsson, R1-050765, Aug. 29, 2005, London, UK.
"System Peformance of Adaptive Cyclic Delay Diversity (ACDD) Scheme", 3GPP TSG RAN WG1 Meeting 42bis, Samsung, R1-051047, Oct. 10-14, 2005, San Diego, USA.
Bauch et al., "Orthogonal Frequency Division Multiple Access with Cyclic Delay Diversity", 2004 ITG Workshop on Smart Antennas, Mar. 18-19, 2004, pp. 17-24.
U.S. Office Action for copending U.S. Appl. No. 12/326,557, dated Mar. 9, 2011.
US Office Action for copending U.S. Appl. No. 12/326,581, dated Mar. 9, 2011.
Office Action dated Sep. 20, 2010 for U.S. Appl. No. 12/547,238.
Notice of Allowance dated Mar. 22, 2011 for U.S. Appl. No. 12/693,058.
Office Action dated Mar. 23, 2011 for U.S. Appl. No. 12/547,238.
U.S. Office Action, dated May 16, 2011, for U.S. Appl. No. 12/692,986.
U.S. Notice of Allowance issued in U.S. Appl. No. 12/326,581 on Jun. 20, 2011.
U.S. Notice of Allowance issued in U.S. Appl. No. 12/693,058 on Jul. 13, 2011.
U.S. Office Action issued in U.S. Appl. No. 12/326,568 on Jul. 13, 2011.
AUER, "Channel Estimation by Set Partitioning for OFDM with Cylic Delay Diversity," IEEE 60th Vehicular Technology Conference, VTC2004-Fall, Sep. 26-29, 2004, vol. 1, pp. 669-673, XP010788461.
U.S. Notice of Allowance issued in U.S. Appl. No. 12/326,557 on Sep. 22, 2011.
U.S. Notice of Allowance issued in U.S. Appl. No. 12/326,557 on Oct. 25, 2011.
U.S. Notice of Allowance issued in U.S. Appl. No. 12/326,568 on Oct. 31, 2011.
Intra-Node B Macro Diversity based on Cyclic Delay Transmissions, 3GPP TSG RAN WG1 #42 on LTE, London, UK, Aug. 29-Sep. 2, 2005, R1-050795, pp. 1-5.
Downlink Multiple Access Scheme for Evolved UTRA, 3GPP TSG RAN WG1 Meeting #40bis Beijing, China, Apr. 4-8, 2005, R1-050249, pp. 1-8.
Enhanced Frequency Diversity and Scheduling Performance in Evolved UTRA, 3GPP TSG RAN WG1 Meeting #42, London, UK, Aug. 29-Sep. 2, 2005, R1-050888, pp. 1-6.
Further Details on Adaptive Cyclic Delay Diversity Scheme, 3GPP TSG RAN WG1 Meeting #42bis, San Diego, USA, Oct. 10-14, 2005, R1-051046, pp. 1-8.
Physical Channels and Multiplexing in Evolved UTRA Downlink, 3GPP TSG RAN WG1 Ad Hoc on LTE, Sophia Antipolis, France, Jun. 20-21, 2005, R1-050590, pp. 1-24.

* cited by examiner

FIG. 6A
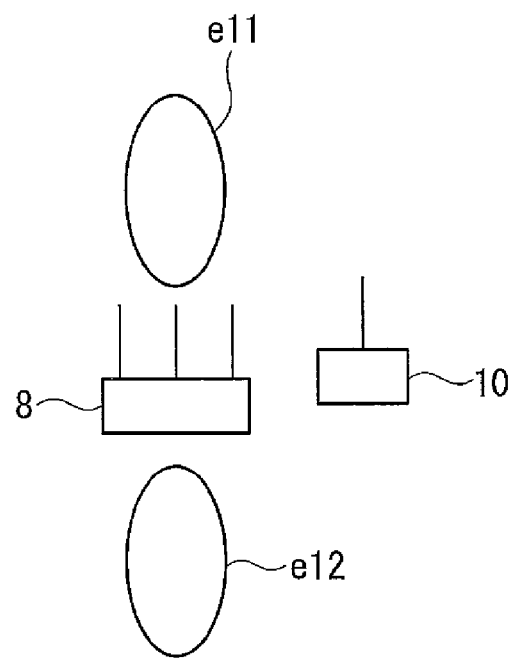
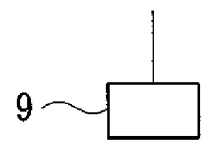
FIG. 6B
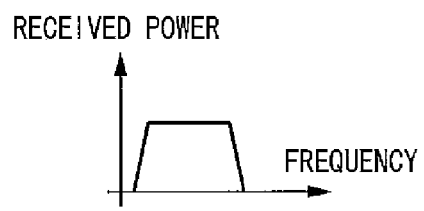
FIG. 6C
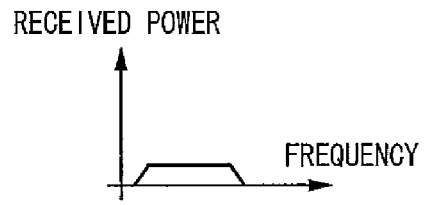

FIG. 7A
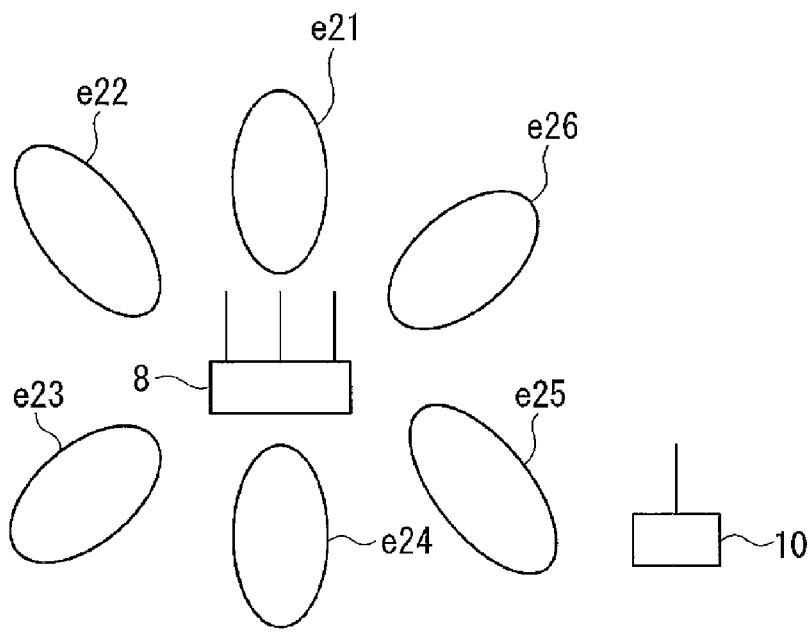
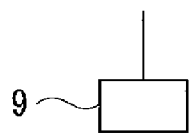
FIG. 7B
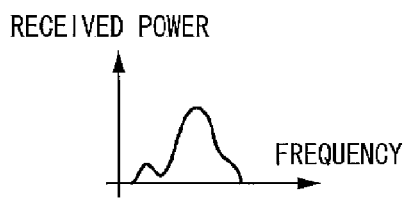
FIG. 7C
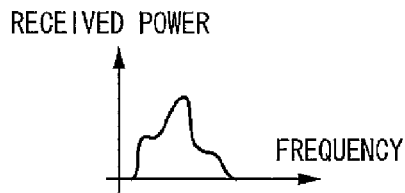

FIG. 16
| MCS INFORMATION | MODULATION SCHEME | CODING RATE | TRANSMISSION SPEED |
|---|---|---|---|
| 1 | QPSK | 1/8 | 1.942Mbps |
| 2 | QPSK | 1/4 | 3.884Mbps |
| 3 | QPSK | 1/2 | 7.782Mbps |
| 4 | QPSK | 2/3 | 10.376Mbps |
| 5 | 16QAM | 1/2 | 15.582Mbps |
| 6 | 16QAM | 2/3 | 20.776Mbps |
| 7 | 64QAM | 1/2 | 23.382Mbps |
| 8 | 64QAM | 3/5 | 28.058Mbps |
| 9 | 64QAM | 2/3 | 31.176Mbps |
| 10 | 64QAM | 3/4 | 35.072Mbps |
FIG. 17A
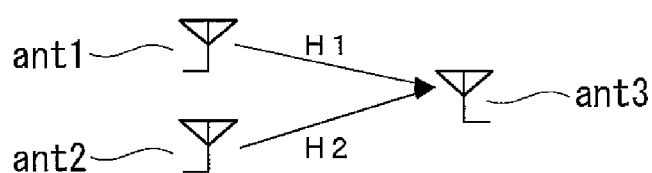
FIG. 17B
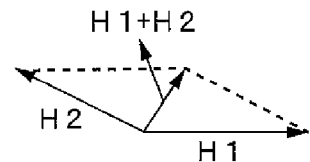
FIG. 17C
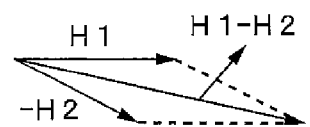

| | TRANSMISSION ANTENNA 2 | TRANSMISSION ANTENNA 3 | TRANSMISSION ANTENNA 4 |
|---|---|---|---|
| PHASE ROTATION AMOUNT AT KTH SUBCARRIER | 0 | $\Theta k/2$ | $\Theta k + \pi$ |

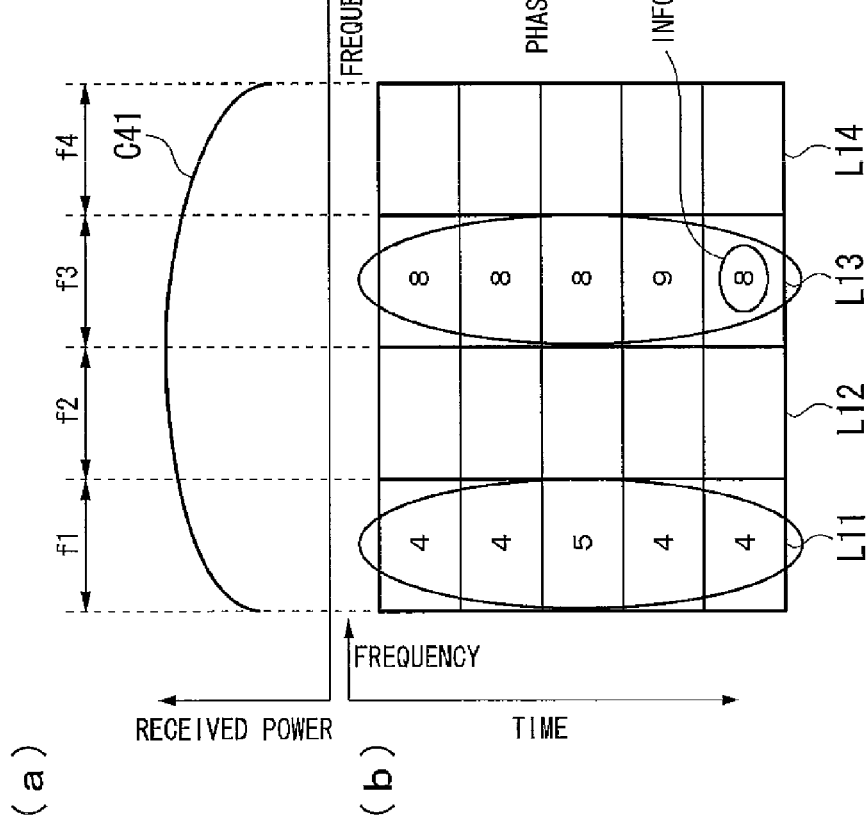

FIG. 34
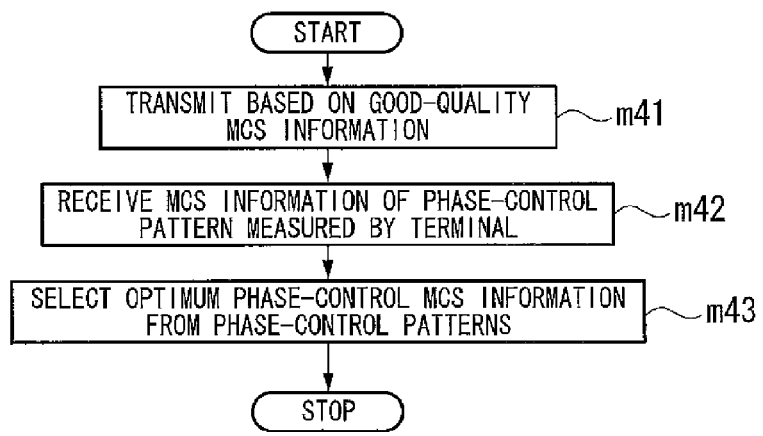
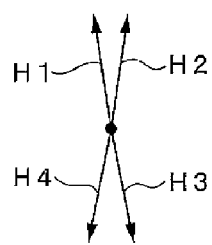
FIG. 35A
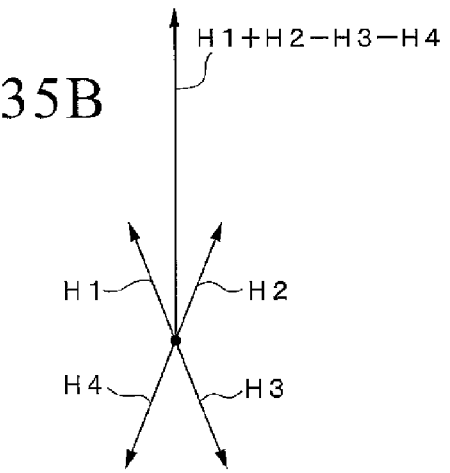
FIG. 35B

FIG. 36

|  | FIRST TRANSMISSION ANTENNA | SECOND TRANSMISSION ANTENNA | THIRD TRANSMISSION ANTENNA | FOURTH TRANSMISSION ANTENNA |
|---|---|---|---|---|
| PHASE-CONTROL PATTERN 1 | ○ | ○ | × | × |
| PHASE-CONTROL PATTERN 2 | ○ | × | ○ | × |
| PHASE-CONTROL PATTERN 3 | ○ | × | × | ○ |

○ : PHASE-CONTROL
× : NO PHASE-CONTROL

WIRELESS TRANSMITTER AND WIRELESS TRANSMISSION METHOD

TECHNICAL FIELD

The present invention relates to wireless transmitter and a wireless transmission method, and more particularly relates to a wireless transmitter and a wireless transmission method that transmit a signal from a wireless transmitter including a plurality of transmission antennas to a terminal.

Priority is claimed on Japanese Patent Application No. 2005-371336, filed Dec. 26, 2005, the content of which is incorporated herein by reference.

BACKGROUND ART

Recently, chiefly in multicarrier transmission systems, a method of scheduling users by dividing them into a plurality of blocks along the frequency axis-time axis is proposed. Here, a region stipulated on the frequency axis and the time axis established when a user performs communication is termed an 'assignment slot', and a block that forms the base when determining an assignment slot is termed a 'chunk'.

A method is proposed whereby, when transmitting broadcast/multicast signals and control signals, a wide block is assigned in the frequency direction to obtain frequency diversity, ensuring that errors are unlikely even at low received power. When transmitting a unicast signal, which is a one-to-one communication between terminals functioning as a wireless transmitter and a wireless receiver, a narrow block is assigned in the frequency direction, ensuring that multi-user diversity is obtained.

FIGS. 40 and 41 are diagrams illustrating the relationship between time (vertical axis) and frequency (horizontal axis) of a signal transmitted from a wireless transmitter to a wireless receiver. In the two-dimensional plane formed by the time axis and the frequency axis, the time direction is divided into time widths t1 to t5. The time widths of transmission times t1 to t5 are the same. The frequency axis is divided into frequency widths f1 to f4. The frequency widths of transmission frequencies f1 to first supporting member 4 are the same, namely F.

Using the transmission times t1 to t5 and the transmission frequencies f1 to f4, twenty chunks K1 to K20 are set in the two-dimensional plane formed by the time axis and the frequency axis.

As shown in FIG. 41, for example, four chunks K1 to K4 are joined in the frequency axis direction, and the time axis direction is divided into three equal sections, creating communication slots S1 to S3 having time widths of t1/3 and frequency widths of 4×f1. Slot S is assigned to a first user, slot S2 is assigned to a second user, and slot S3 is assigned to a third user. This enables the first to third users to obtain a frequency diversity effect. Frequency diversity is achieved when transmitting signals from a wireless transmitter including a plurality of transmission antennas to a wireless receiver, by applying a large delay time difference between signals transmitted from the plurality of transmission antennas. Frequency diversity effect is the increase in communication quality that is achieved, utilizing the fact that a large delay time difference is applied between signals transmitted from the plurality of transmission antennas, by using signals in regions of good reception quality at the receiver. A chunk that transmits a signal from the wireless transmitter to the wireless receiver while applying frequency diversity is termed a 'frequency diversity region'.

Also, for example, chunk K5 is assigned as slot S4 to a fourth user. Chunks K6 and K7 are joined and assigned as slot S5 to a fifth user. Chunk K8 is assigned as slot S6 to a sixth user. This enables the fourth to sixth users to obtain a multi-user diversity effect. Multi-user diversity is achieved when transmitting signals from a wireless transmitter including a plurality of transmission antennas to a wireless receiver, by applying a small delay time difference between signals transmitted from the plurality of transmission antennas. Multi-user diversity effect is the increase in communication quality that is achieved, utilizing the fact that a small delay time difference is applied between the signals transmitted from the plurality of transmission antennas, by using signals in regions where there is little fluctuation in received power. A chunk that transmits a signal from the wireless transmitter to the wireless receiver while applying multi-user diversity is termed a 'multi-user diversity region'.

Chunks K9 and K11 are, for example, assigned as slot S7 to a seventh user. Chunks K10 and K12 are joined and divided into three equal parts along the time axis, creating communication slots S8 to S10 having time widths of t3/3 and frequency widths of 2×f2. Slot S8 is assigned to an eighth user, slot S8 is assigned to a ninth user, and slot S10 is assigned to a tenth user. This enables the seventh to tenth users to obtain a multi-user diversity effect.

Also, for example, chunk K13 is assigned to an eleventh user as slot S11. Chunk K14 is assigned as slot S12 to a twelfth user. Chunks K5 and K16 are joined, and assigned as slot 813 to a thirteenth user. This enables the eleventh to thirteenth users to obtain a multi-user diversity effect.

Also, for example, chunks K17 and K19 are assigned as slot S14 to a fourteenth user. Chunks K18 and K20 are joined, and divided into three equal parts along the time axis, creating communication slots S15 to S17 having time widths of t5/3 and frequency widths of 2×f2. Slot S15 is assigned to a fifteenth user, slot S16 is assigned to a sixteenth user, and slot S17 is assigned to a seventeenth user. This enables the fifteenth to seventeenth users to obtain a multi-user diversity effect.

Non-Patent Literature 1: 3GPP contribution, R-050249
Non-Patent Literature 2: 3GPP contribution, R1-050590

DISCLOSURE OF THE INVENTION

Problems to be Solved by the Invention

In conventional techniques, when transmitting a signal from a wireless transmitter to a terminal forming a wireless receiver while applying frequency diversity or multi-user diversity to each chunk, if there are a great many wireless receivers that use chunks belonging to frequency band with good reception quality, there is a problem that only a predetermined number of wireless receivers can communicate at good communication quality with the wireless transmitter.

The present invention has been realized in view of the above problems, and aims to provide a wireless transmitter and a wireless transmission method that can prevent a reduction in communication quality even when it is not possible for a plurality of terminals to perform communication using chunks belonging to a frequency band with good reception quality.

Means for Solving the Problems

A wireless transmitter of the invention has been realized in order to solve the above problems, and includes: a plurality of transmission antennas; a transmission circuit controller that, based on reception qualities reported from terminals, assigns a communication frequency band and a communication time in a frame to each terminal, and sends a phase-control report signal that determines whether to perform phase-control; and a transmission circuit unit that, at the communication frequency and communication time, applies a different delay to each of the plurality of transmission antennas which diversity is to be given to, and performs phase-control based on the phase-control report signal.

The transmission circuit controller of the wireless transmitter according to the invention may send a multi-user diversity/frequency diversity report signal that determines, for each communication frequency band and communication time, whether to make it a multi-user diversity region or a frequency diversity region, to the transmission circuit unit, and the transmission circuit unit may apply a different delay to each of the plurality of transmission antenna, based on the multi-user diversity/frequency diversity report signal.

The transmission circuit controller of the wireless transmitter according to the invention, in assigning a communication frequency band having poor reception quality to a terminal, may send a phase-control report signal which determines that phase-control is to be performed.

The transmission circuit controller of the wireless transmitter according to the invention may set, as the frequency band having poor reception quality, a frequency band other than one having the best reception quality.

The transmission circuit controller of the wireless transmitter according to the invention may set, as the frequency band having poor reception quality, a frequency band having a reception quality that is no greater than a predetermined threshold, determined based on reception quality in a frequency band having the best reception quality.

The transmission circuit controller of the wireless transmitter according to the invention may use at least one of MCS, SINR, and received power as the reception quality.

The transmission circuit controller of the wireless transmitter according to the invention may set the predetermined threshold at one-half of the reception quality in the frequency band having the best reception quality.

The transmission circuit controller of the wireless transmitter according to the invention, when assigning a frequency band having poor reception quality to a terminal, may assign a plurality of communication frequency bands and communication times to that terminal.

Furthermore, the wireless transmitter according to the invention may include a transmission antenna circuit unit that, when the phase-control report signal reports that phase-control is to be performed, performs phase-control of at least one of the plurality of transmission antennas.

When the phase-control report signal reports that phase-control is to be performed, the transmission antenna circuit unit of the wireless transmitter according to the invention may perform phase-control of one of the plurality of transmission antennas.

The transmission circuit controller of the wireless transmitter according to the invention may send pilot arrangement information, which relates to an arrangement of pilot channels, and the phase-control report signal to the transmission circuit unit, re-receive the reception quality of the terminal for which the phase-control report signal reported that phase-control is to be performed, and, based on the pilot arrangement information, assign a pilot channel.

The transmission circuit controller of the wireless transmitter according to the invention may assign a pilot channel for propagation path estimation at a plurality of communication frequency bands and communication times, report the fact that the pilot channel is one of least one phase-control patterns to the transmission circuit unit, and transmit the pilot channel.

The transmission circuit controller of the wireless transmitter according to the invention may set the plurality of communication frequency bands and communication times such that they extend over a plurality of frames.

The transmission circuit controller of the wireless transmitter according to the invention may set the number of communication frequency bands and communication times, and the number of frames, at the number of phase-control patterns.

The transmission circuit controller of the wireless transmitter according to the invention may compare, based on the reception quality transmitted from the terminal, the reception qualities of the phase-control patterns, and select a phase-control pattern having the best reception quality.

In the wireless transmitter according to the invention, the plurality of transmission antennas may include: a first transmission antenna, a second transmission antenna, a third transmission antenna, and a fourth transmission antenna; there may be three phase-control patterns; and the transmission circuit controller may perform phase-control of two transmission antennas from among the first transmission antenna to the fourth transmission antenna.

The transmission circuit unit of the wireless transmitter according to the invention may rotate the phase of a transmission antenna for phase-control by $\pi$.

A wireless transmitter according to the invention includes: a plurality of transmission antennas; and the wireless transmitter that assigns, based on reception qualities reported from terminals, a communication frequency band and a communication time in a frame to each terminal, applies delays, at the communication frequency and communication time, to the plurality of transmission antennas which diversity is to be given to, and selects a phase-control amount for phase-control.

The wireless transmitter according to the invention may select 0 or $\pi$ as the phase-control amount.

In the wireless transmitter according to the invention, the delay applied to each of the plurality of transmission antennas is selected based on a multi-user diversity/frequency diversity report signal that determines, for each communication frequency band and communication time, whether to make it a multi-user diversity region or a frequency diversity region.

A wireless transmission method according to the invention includes: a first step of assigning, based on reception qualities reported from terminals, a communication frequency band and a communication time in a frame, and sending a phase-control report signal that determines whether to perform phase-control, to each terminal; and a second step of applying, at the communication frequency and communication time, a different delay to each of a plurality of transmission antennas which diversity is to be given to, and performing phase-control based on the phase-control report signal.

Effects

In the present invention, the transmission circuit controller reports, for each chunk in the frame, a multi-user diversity/frequency diversity report signal that determines whether to make it a frequency diversity region or a multi-user diversity region, assigns a chunk to each terminal based on reception quality reported from the terminals; based on the multi-user diversity/frequency diversity report signal and a phase-control report signal, the transmission circuit unit appends a different delay to each of the n transmission antennas.

Consequently, chunks can be assigned based on the reception quality at a terminal forming a wireless receiver, and weak signals can be changed to strong signals by performing phase-control when the reception quality at the terminal is poor, whereby the reception quality of the signal received by the terminal from the wireless receiver can be increased.

BRIEF DESCRIPTION OF THE DRAWINGS

FIG. 6A is an explanatory diagram of a case where identical signals are transmitted from a plurality of transmission antennas of a wireless transmitter 8, to a wireless receiver, without applying delay time.

FIG. 6B is an explanatory diagram of a case where identical signals are transmitted from a plurality of transmission antennas of a wireless transmitter 8, to a wireless receiver, without applying delay time.

FIG. 6C is an explanatory diagram of a case where identical signals are transmitted from a plurality of transmission antennas of a wireless transmitter 8, to a wireless receiver, without applying delay time.

FIG. 7A is an explanatory diagram of a case where identical signals are transmitted from a plurality of transmission antennas of a wireless transmitter 8, to a wireless receiver, after applying delay time.

FIG. 7B is an explanatory diagram of a case where identical signals are transmitted from a plurality of transmission antennas of a wireless transmitter 8, to a wireless receiver, after applying delay time.

FIG. 7C is an explanatory diagram of a case where identical signals are transmitted from a plurality of transmission antennas of a wireless transmitter 8, to a wireless receiver, after applying delay time.

FIG. 16 is a diagram of an example of MCS information.

FIG. 17A is an explanatory diagram of a phase-control method according to this embodiment.

FIG. 17B is an explanatory diagram of a phase-control method according to this embodiment.

FIG. 17C is an explanatory diagram of a phase-control method according to this embodiment.

FIG. 27A is an explanatory diagram of a process of a scheduling unit 134 according to the second embodiment of the invention.

FIG. 27B is a diagram of a method of assigning terminals 15 to 20 to groups L11 and L13 that belong to frequency bands f1 and f3, which have been assigned as multi-user diversity regions.

FIG. 34 is a flowchart of a process of a scheduling unit 334 (FIG. 33) according to the fourth embodiment of the invention.

FIG. 35A is an explanatory diagram of reception quality when a wireless transmitter includes four transmission antennas.

FIG. 35B is an explanatory diagram of reception quality when a wireless transmitter includes four transmission antennas.

FIG. 36 is an explanatory diagram of phase-control patterns when the wireless transmitter includes four transmission antennas.

BEST MODE FOR CARRYING OUT THE INVENTION

Figure 1:
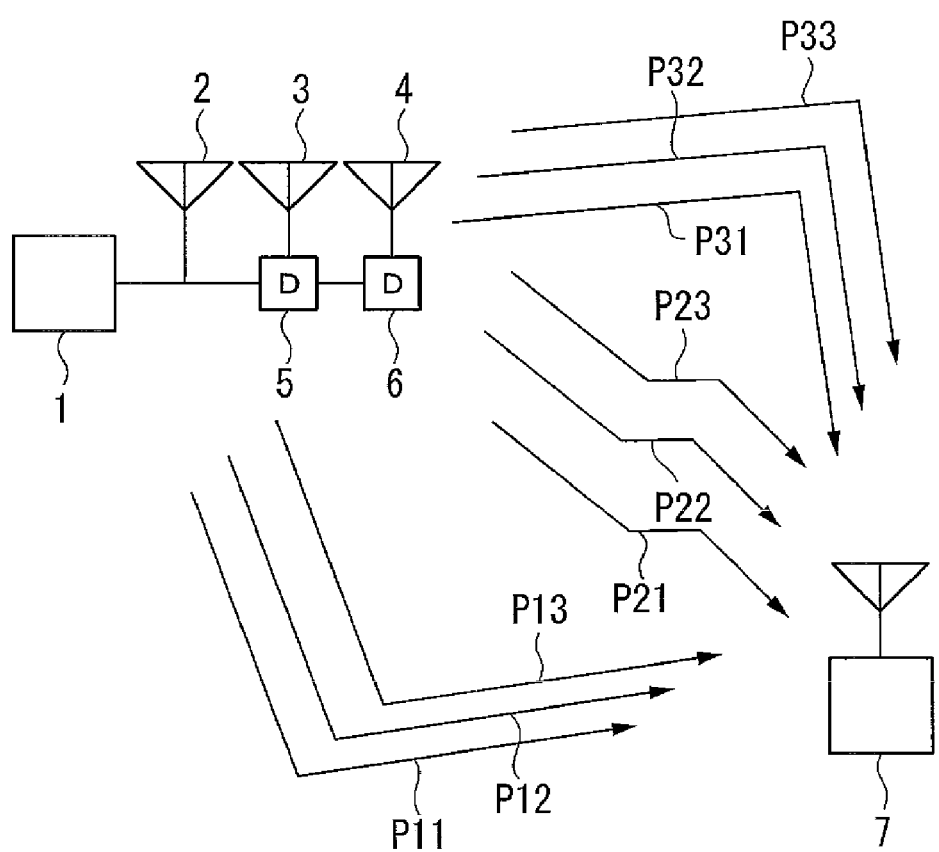
FIG. 1 is an explanatory diagram of a communication method between a wireless transmitter 1 and a wireless receiver 7 according to an embodiment of the invention.

FIG. 1 is an explanatory diagram of a communication method between a wireless transmitter 1 and a wireless receiver 7 according to an embodiment of the invention. A signal is transmitted from the wireless transmitter 1, and arrives at the wireless receiver 7 via a plurality of propagation paths, for example, p11 to p13, p21 to p23, and p31 to p33. The wireless transmitter 1 has a plurality of transmission antennas 2 to 4. Delay devices 5 and 6 apply delay times T and T2 to signals transmitted from transmission antennas 5 and 6 respectively.

The wireless receiver 7 receives signals transmitted from the wireless transmitter 1. While in FIG. 1 the wireless transmitter 1 includes three transmission antennas 2 to 4, it can be provided with a plurality of transmission antennas of a number other than three.

The plurality of transmission antennas are mounted in a wireless transmitter including base station apparatus that communicates with mobile telephones and the like, transmission antennas between different sectors in a same base station apparatus within a same sector, transmission antennas of different base station apparatuses, and so on. This example describes a case where a plurality of transmission antennas are arranged in a same sector. Delay devices 5 and 6 of FIG. 1 respectively apply delay times T [and T2@], delay time T being applied at transmission antenna 3, and delay time T2, at transmission antenna 4, as mentioned above.

Figure 2A:
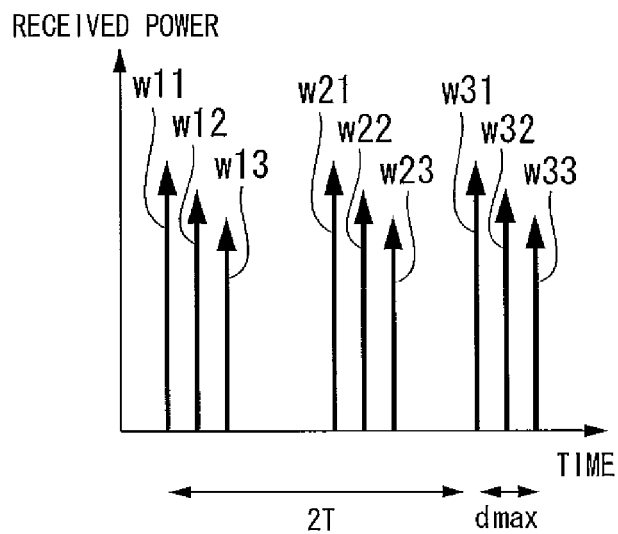
FIG. 2A is a diagram of delay profiles of signals w11 to w13, w21 to w23, and w31 to 33 that arrive at the wireless receiver 7 via a plurality of propagation paths p11 to p13, p21 to p23, and p31 to p33 (FIG. 1), which have different delay times.
Figure 2B:
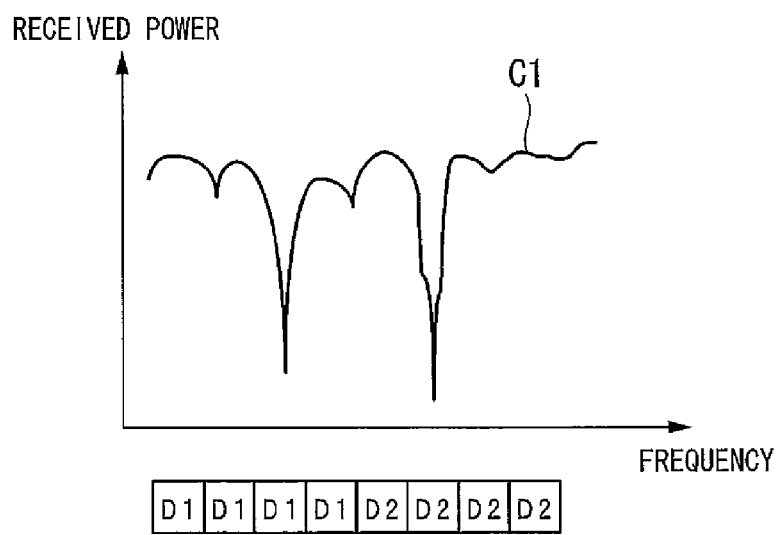
FIG. 2B is a diagram expressing a transfer function C1 when the delay profiles of FIG. 2A are frequency-converted, showing frequency (horizontal axis) against receiver power (vertical axis).

FIGS. 2A and 2B are explanatory diagrams of examples of signals received by the wireless receiver 7 from the wireless transmitter 1. FIG. 2A depicts delay profiles of signals w11 to w13, w21 to w23, and w31 to 33 that arrive at the wireless receiver 7 via the plurality of propagation paths p11 to p13, p21 to p23, and p31 to p33 (FIG. 1), which have different delay times. In FIG. 2A, the horizontal axis represents time, and the vertical axis represents received power. As shown in FIG. 2A, the instantaneous delay profile has a maximum delay wave of $2T+d_{max}$, and has a much larger maximum delay wave than when the same signal is transmitted from every transmission antenna. Incidentally, $2T+d_{max}$ represents the arrival time difference between the fastest-arrival propagation path and the slowest-arrival propagation path, when a wave from a transmission antenna arrives at a reception antenna.

FIG. 2B expresses a transfer function C1 when the delay profiles of FIG. 2A are frequency-converted, showing frequency (horizontal axis) against receiver power (vertical axis). In the delay profiles, the increase in the maximum delay time $2T+d_{max}$ signifies the increased speed of frequency fluctuations of the transfer function C1. Therefore, as shown in FIG. 2B, data D1 and D2 are spread at a spreading ratio of 4 and assigned to subcarriers. On the wireless transmitter 1 side, while it is desirable to control the spreading ratio or the coding rate of the error-correction code in correspondence with frequency fluctuations in the transfer function C1, since in this method the wireless transmitter 4 side already knows the delay time 2T, the spreading ratio or the coding rate of the error-correction code can be determined irrespective of frequency fluctuations in the propagation path.

On the other hand, when a multi-user diversity effect is desired, the maximum delay time $2T+d_{max}$ should preferably not be too large.

Figure 3A:
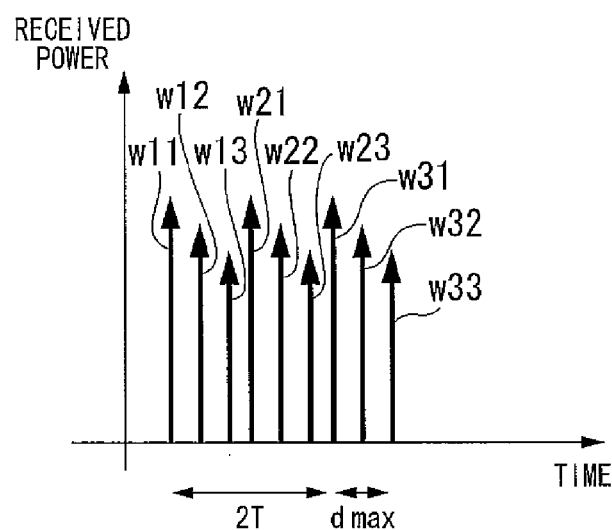
FIG. 3A is a diagram of delay profiles of signals w11 to w13, w21 to w23, and w31 to 33 that arrive at the wireless receiver 7 via a plurality of (three) propagation paths p11 to p13, p21 to p23, and p31 to p33 (FIG. 1), which have different delay times.
Figure 3B:
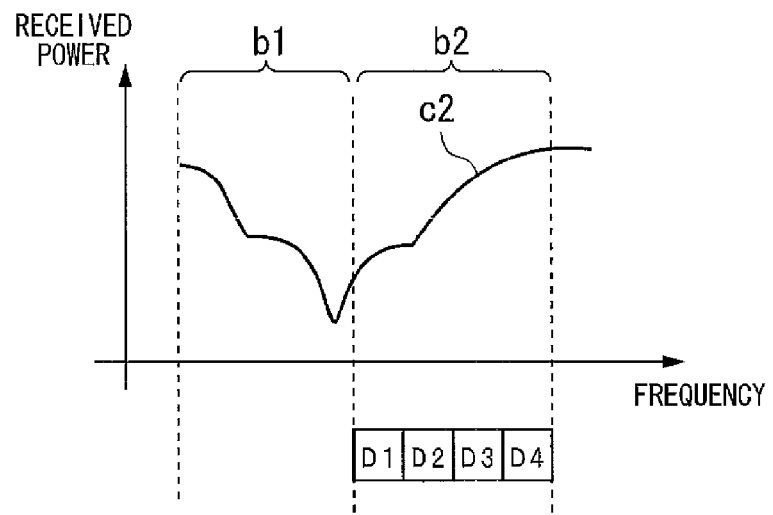
FIG. 3B is a diagram of a transfer function C2 at a wireless receiver used by a user u1.
Figure 3C:
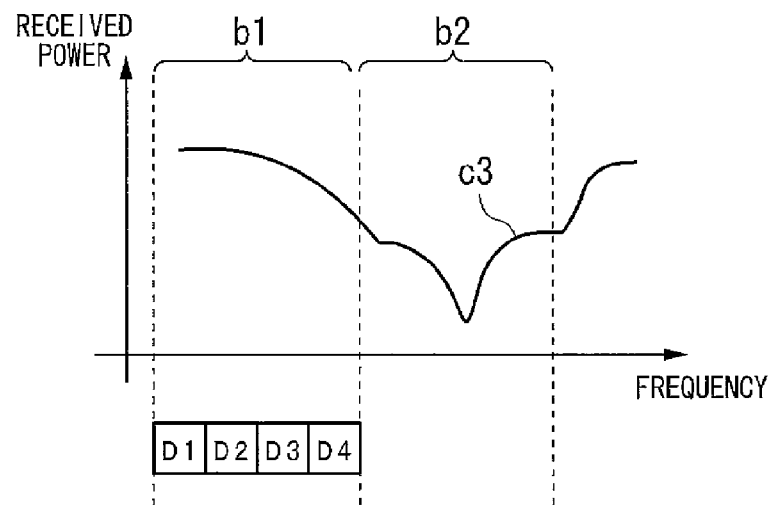
FIG. 3C is a diagram of a transfer function C3 at a wireless receiver used by a user u2.

FIGS. 3A, 3B, and 3C are explanatory diagrams of another example of signals received by a wireless transmitter 1 from a wireless transmitter 1. These diagrams depict delay profiles and transfer functions of signals that arrive at the wireless receiver 7 via a plurality of propagation paths, which have different delay times. FIG. 3A depicts delay profiles of signals w11 to w13, w21 to w23, and w31 to 33 that arrive at the wireless receiver 7 via the plurality of (three) propagation paths p11 to p13, p21 to p23, and p31 to p33 (FIG. 1), which have different delay times. In FIG. 3A, the horizontal axis represents time, and the vertical axis represents received power.

FIG. 3B is a transfer function C2 at a wireless receiver used by a user u1. FIG. 3C is a transfer function C3 at a wireless receiver used by a user u2. Since the positions of the wireless receivers used by user u1 and user u2 are different with respect to the wireless transmitter, their instantaneous transfer functions are also different. If the region of lower frequency in FIGS. 3B and 3C is termed frequency channel b1, and the region of high frequency is termed frequency channel b2, for user u1, frequency channel b2 has greater average received power and hence better quality, whereas for user u2, frequency channel b1 has greater average received power and hence better quality. Therefore, for user u1, data D1 to D4 are transmitted from the wireless transmitter 1 to the wireless receiver using frequency channel b2. For user u2, data D1 to D4 are transmitted from the wireless transmitter 1 to the wireless receiver using frequency channel b1.

By using the quality difference of each frequency channel at a given instant in this manner, a different user performs communication on each frequency channel, making it possible to obtain a multi-user diversity effect that enhances the transmission efficiency.

However, when the maximum delay time $2T+d_{max}$ is too large, the speed of the frequency fluctuation of the transfer function increases, and the quality difference between frequency channel b1 and frequency channel b2 decreases. Therefore, to obtain an adequate multi-user diversity effect, as shown in FIG. 3A, the maximum delay time $2T+d_{max}$ must be reduced.

Figure 4A:
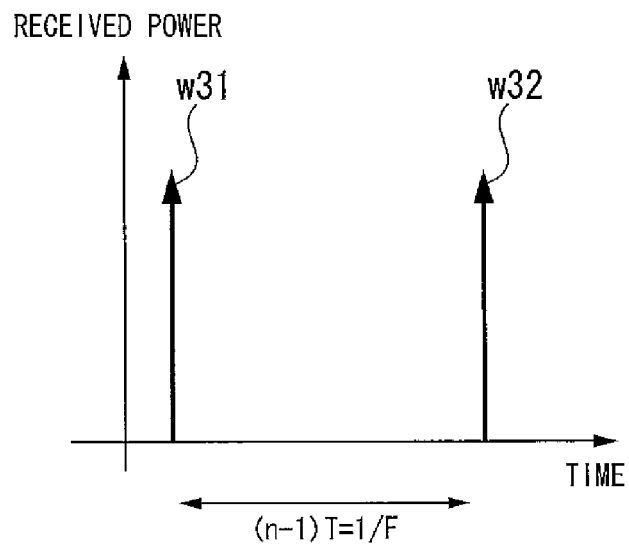
FIG. 4A is a diagram of the relationship between maximum delay time (n−1) and frequency fluctuation.
Figure 4B:
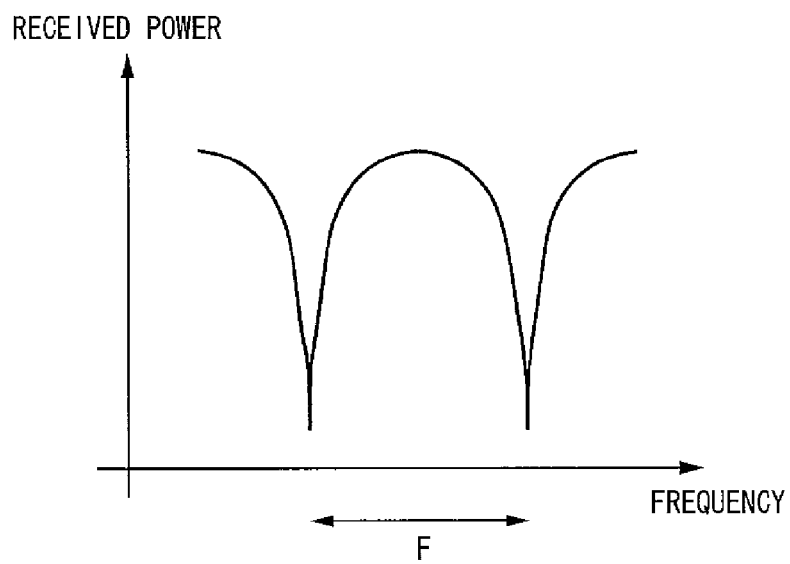
FIG. 4B is a diagram of the relationship between maximum delay time (n−1) and frequency fluctuation.

FIGS. 4A, 4B, 5A, and 5B are diagrams of the relationship between maximum delay time (n−1)T and frequency fluctuation. Here, n is an integer of 2 or more, and represents the number of transmission antennas of the wireless transmitter. FIG. 4B is the transfer function of the propagation path when the arrival time difference between two receive signals w31 and w32 is (n−1)T as shown in FIG. 4A.

That is, the interval of the fall in the amplitude of the received power (vertical axis) is F=1/(n−1)T.

Figure 5A:
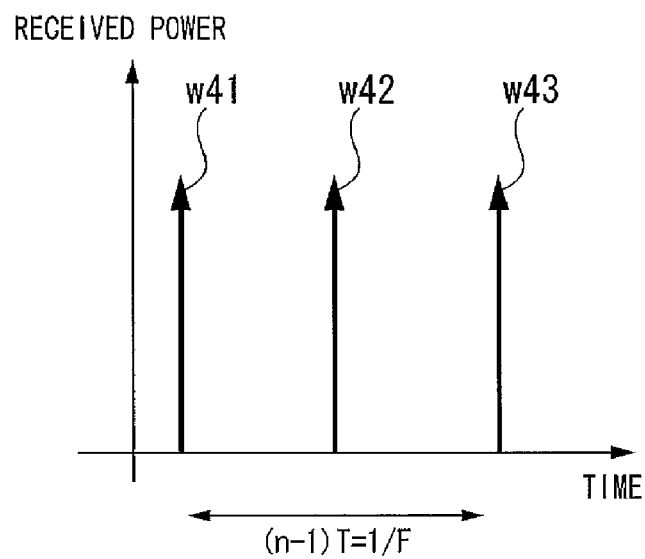
FIG. 5A is a diagram of the relationship between maximum delay time (n−1) and frequency fluctuation.
Figure 5B:
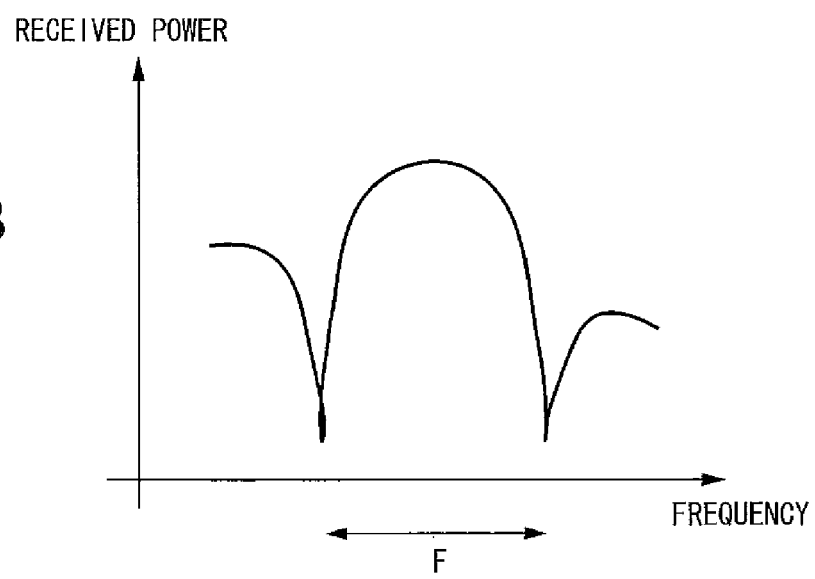
FIG. 5B is a diagram of the relationship between maximum delay time (n−1) and frequency fluctuation.

Even when there are three receive signals w41 to w43 as shown in FIG. 5A, if the arrival time difference between receive signal w41 that arrives first and receive signal w43 that arrives last is (n−1)T, as shown in FIG. 5B, the frequency interval of the fall in the amplitude of the received power (vertical axis) is F=1/(n−1)T.

When it is desired to obtain a frequency diversity effect, and when it is desired to obtain a multi-user diversity effect, as already mentioned, since the frequency fluctuations in the appropriate transfer functions for these are different, when it is desired to obtain a frequency diversity effect, if $F_c$ is the frequency bandwidth of a chunk that is a base region defined by frequency axis and time axis established when the user performs communication, the maximum delay time between transmission antennas (n−1)T is set such that $(n-1)T>1/F_c$, obtaining an environment where it is easy to obtain the frequency diversity effect.

In contrast, when it is desired to obtain a multi-user diversity effect, if the maximum delay time between transmission antennas (n−1)T is set such that $(n-1)T<1/F_c$, this can obtain an environment where it is easy to obtain the multi-user diversity effect. A setting of $(n-1)T<1/F_c$ includes (n−1)T=0. While the delay time appended to each transmission antenna is expressed as an n−1 multiplication of T, and T is constant, the T for each transmission antenna can be changed. Also, when it is desired to obtain a multi-user diversity effect, instead of a setting of $(n-1)T<1/F_c$, by reducing the number of transmission antennas used in transmitting the signals, the maximum delay time can be reduced.

As described above, depending on whether a transmit signal is transmitted by frequency diversity or multi-user diversity (i.e. whether the setting is $(n-1)T>1/F_c$ or $(n-1)T<1/F_c$)) a frequency diversity effect or a multi-user diversity effect can be obtained without affecting the state of the propagation path.

Incidentally, the matter of whether a signal from the wireless transmitter is transmitted by frequency diversity or multi-user diversity can be switched according to the type of signal to be transmitted (pilot channel, control signal, broadcast/multicast signal, etc.), the mobility speed of the wireless transmitter (frequency for high mobility speed, multi-user for low mobility speed), and so on.

FIGS. 6A, 6B, and 6C are explanatory diagrams of a case where identical signals are transmitted from a plurality of transmission antennas of a wireless transmitter 8, to a wireless receiver, without applying delay time. As shown in FIG. 6A, at the wireless transmitter 8, three non-directional transmission antennas 3 are arranged in series along a horizontal direction. When transmitting a signal with this wireless transmitter 8, since elliptical loops e11 and e12 are generated, there is a direction where receive signals are received at high received power in all frequency bands, as with wireless receiver 9 (FIG. 6B), and one where receive signals are received at low received power in all frequency bands, as with wireless receiver 10 (FIG. 6C).

FIGS. 7A, 7B, and 7C are explanatory diagrams of a case where identical signals are transmitted from a plurality of transmission antennas of a wireless transmitter 8, to a wireless receiver, after applying delay times. As shown in FIG. 7A, at the wireless transmitter 8, three non-directional transmission antennas 3 are arranged in series along a horizontal direction. Although, considering a narrow band, since elliptical loops e21 to e16 are generated, there will be frequency regions of high received power and frequency regions of low receiver power among the receive signals, since the average received power can be made almost constant irrespective of direction, approximately the same quality can be obtained with the received power of the signal at the wireless receiver 9 (FIG. 7B) and with the received power of the signal at wireless receiver 10 (FIG. 7C). Therefore, the method of transmitting signals after applying difference delay times to each of the transmission antennas of the wireless transmitter 8 can correct defects when identical signals are transmitted from the plurality of transmission antennas as described in FIGS. 6A to 6C.

Figure 8:
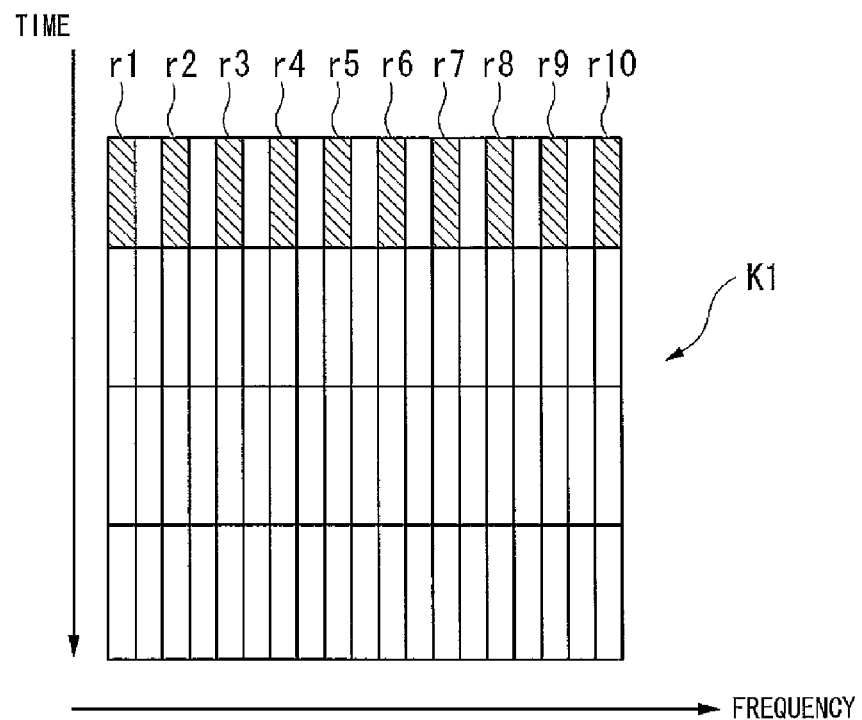
FIG. 8 is a diagram of the configuration of a chunk K1 used in this embodiment.

FIG. 8 is a diagram of a configuration of a chunk K1 used in this embodiment. In FIG. 8, the horizontal axis represents frequency, and the vertical axis represents time. A chunk is a rectangular region in the plane defined by the frequency axis and the time axis, and is determined by a predetermined frequency band and a predetermined time band. Chunk K1 is divided into nineteen frequency bands and four time bands. Common pilot channels (CPICH) are arranged in regions r1 to r10. These common pilot channels are used for estimating propagation paths during demodulation, measuring the quality of receive signals, etc. While this explanation relates only to chunk K1, the other chunks have the same configuration as K1 and will not be repetitiously explained.

Figure 9:
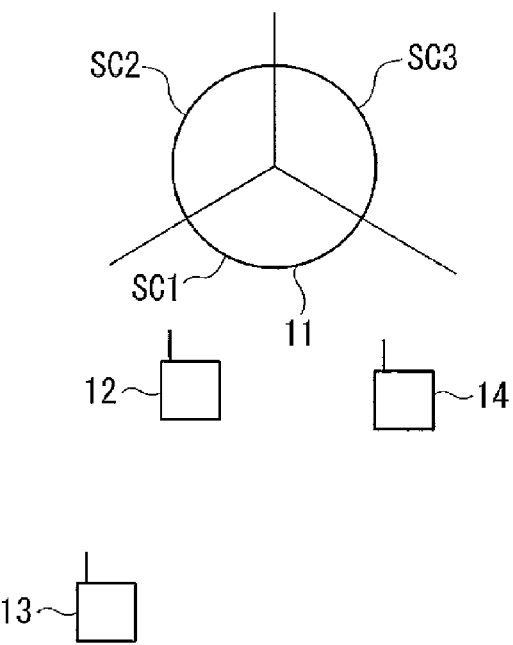
FIG. 9 is an explanatory diagram of the arrangement of a base station apparatus 11 forming a wireless transmitter, and terminals 12 to 14 forming wireless receivers.

FIG. 9 is an explanatory diagram of the arrangement of a base station apparatus 11 forming a wireless transmitter, and terminals 12 to 14 forming wireless receivers. The base station apparatus 11 transmits signals to three sectors SC1 to SC3. A plurality of (e.g. three) transmission antennas are installed in each of the sectors SC1 to SC3. This explanation describes a case where there are three terminals 12 to 14 in sector SC1, and each of those terminals 12 to 14 performs wireless communication with the base station apparatus 11.

Figure 10:
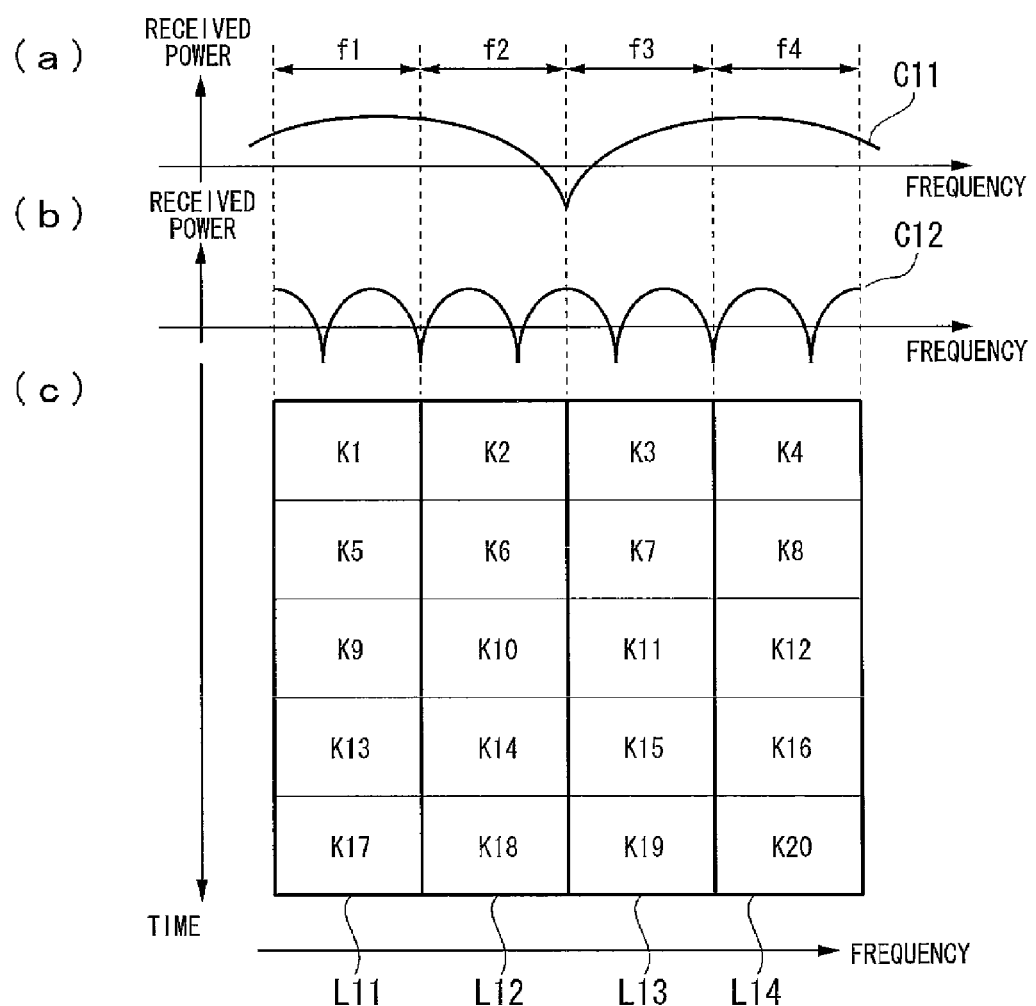
FIG. 10 is an explanatory diagram of a signal observed at a wireless receiver forming the terminal 12 (FIG. 9) according to this embodiment.

FIG. 10 is an explanatory diagram of a signal observed at a wireless receiver forming the terminal 12 (FIG. 9) according to this embodiment. In (a) and (b) of FIG. 10, the horizontal axis represents frequency, and the vertical axis represents received power. In FIG. 10, (a) shows a transfer function C11 observed in a multi-user diversity region. In FIG. 10, (b) shows a transfer function C12 observed in a frequency diversity region.

In FIG. 10 (c), the horizontal axis represents frequency, and the vertical axis represents time. This example describes a case where communication is performed after assigning chunks K1 to K20 to the users. In FIG. 10 (c), these are divided into a group L11 including chunks K1, K5, K9, K13, and K17, a group L12 including chunks K2, K6, K10, K14, and K1, a group L13 including chunks K3, K7, K11, K16, and K19, and a group L14 including chunks K4, K8, K12, K16, and K20. Groups L11 and L13 are preset as multi-user diversity regions. Groups L12 and L14 are preset as frequency diversity regions.

At terminal 12 (FIG. 9), when a transfer function for the propagation path is determined using the common pilot channels of chunks K1, K5, K9, K13, and K17 contained in group L11, the frequency band f1 of transfer function C11 in FIG. 10 (a) is observed. When a transfer function for the propagation path is determined using the common pilot channels of chunks K2, K6, K10, K14, and K18 contained in group L12, the frequency band f2 of transfer function C12 in FIG. 10 (b) is observed. When a transfer function for the propagation path is determined using the common pilot channels of chunks K3, K7, K11, K15, and K19 contained in group L13, the frequency band f3 of transfer function C11 in FIG. 10 (a) is observed. When a transfer function for the propagation path is determined using the common pilot channels of chunks K4, K8, K12, K16, and K20 contained in group L14, the frequency band f4 of transfer function C12 in FIG. 10 (b) is observed.

The state where chunks K1 to K20 are divided into groups L11 to L14, and assigned to multi-user diversity regions and frequency diversity regions, may be one that does not change, having been fixed at the time of designing the system, or it may fluctuate dynamically in accordance with the state (number of terminals, number of high-speed mobile terminals, information transmission amount) of the terminals they are accommodated in.

Figure 11:
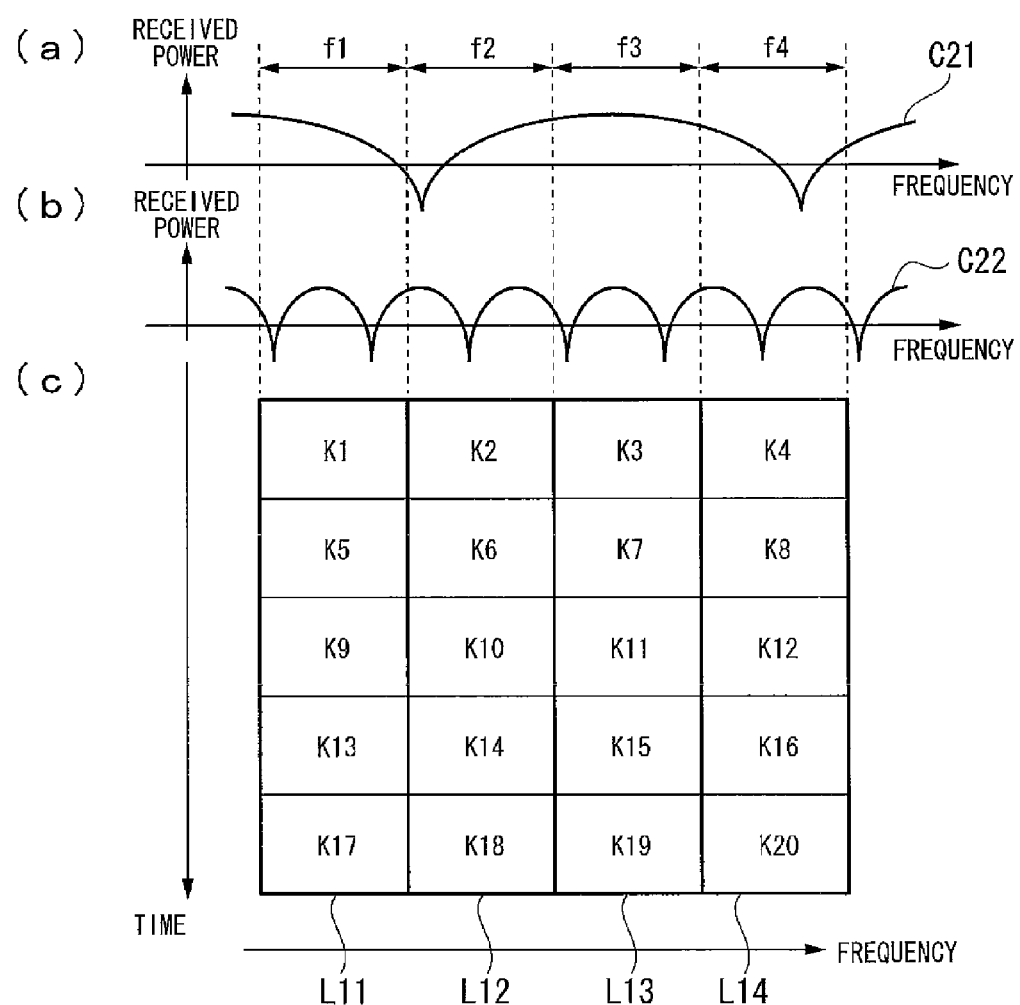
FIG. 11 is an explanatory diagram of a signal observed at a wireless receiver forming the terminal 14 (FIG. 9) according to this embodiment.

FIG. 11 is an explanatory diagram of a signal observed at a wireless receiver forming the terminal 14 (FIG. 9) according to this embodiment. In (a) and (b) of FIG. 11, the horizontal axis represents frequency, and the vertical axis represents received power. FIG. 11 (a) shows a transfer function C21 observed in a multi-user diversity region. FIG. 10 (b) shows a transfer function C22 observed in a frequency diversity region. Since the positions of terminal 14 and terminal 12 with respect to the base station apparatus 11 (FIG. 9) are different, the transfer functions C21 and C22 (FIG. 11 (a) and FIG. 11 (b)) have different waveforms to those of the transfer functions C11 and C12 (FIG. 10 (a) and FIG. 10 (b)).

In FIG. 11 (c), the horizontal axis represents frequency, and the vertical axis represents time. This example describes a case where communication is performed after assigning chunks K1 to K20 to the users. Since the assignment of the chunks K1 to K20 into groups L11 to L14, and the assignment of groups L11 to L14 into frequency diversity regions and multi-user diversity regions, are the same as in FIG. 10 (c), they will not be repetitiously explained.

At terminal 14, when a transfer function for the propagation path is determined using the common pilot channels of chunks K1, K5, K9, K13, and K17 contained in group L11, the frequency band f1 of transfer function C11 in FIG. 11 (a) is observed. When a transfer function for the propagation path is determined using the common pilot channels of chunks K2, K6, K10, K14, and K18 contained in group L12, the frequency band f2 of transfer function C22 in FIG. 11 (b) is observed. When a transfer function for the propagation path is determined using the common pilot channels of chunks K3, K7, K11, K15, and K19 contained in group L13, the frequency band B3 of transfer function C21 in FIG. 11 (a) is observed. When a transfer function for the propagation path is determined using the common pilot channels of chunks K4, K8, K12, K16, and K20 contained in group L14, the frequency band f4 of transfer function C22 in FIG. 11 (b) is observed.

When information such as the quality of the receive signal of each chunk is contained in channel quality indicators (CQI) sent from terminals 12 to 14 (FIG. 9) to the base station apparatus 11, for terminal 12, the base station apparatus 11 compares the quality of the receive signals of groups L11 and L13, i.e. in the frequency band f1 of transfer function C11 and in the frequency band f3 of transfer function C11, determines which has the good quality, and transmits the signal after assigning group L11 (frequency band f1) to terminal 12.

For terminal 14, the base station apparatus 11 compares the quality of the receive signals of groups L11 and L13, i.e. in the frequency band f1 of transfer function C21 and in the frequency band f3 of transfer function C21, determines which has the good quality, and transmits the signal after assigning group L13 (frequency band f3) to terminal 14.

In this embodiment, at the base station apparatus 11, even when different delay times are appended to each transmission antenna for each frequency diversity region and multi-user diversity region, the frequency diversity regions and multi-user diversity regions are determined beforehand, and the different delay times are also appended to the common pilot channels contained in those regions. Consequently, by performing scheduling in compliance with CQI information from the terminals, an appropriate chunk can be assigned to each terminal, whereby an adequate multi-user diversity effect can be obtained.

Figure 12:
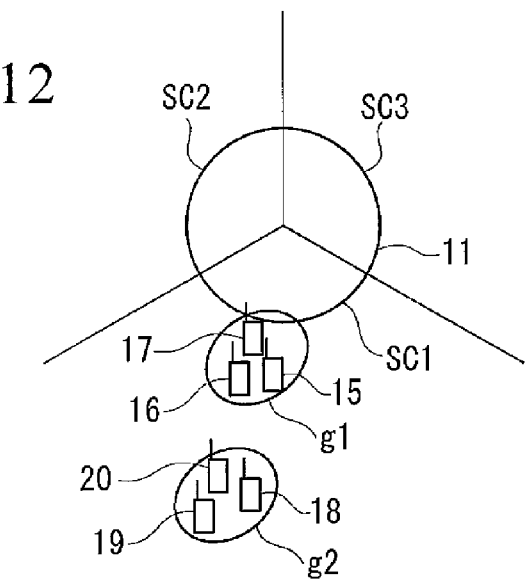
FIG. 12 is a diagram of another example of an arrangement of a base station apparatus 11 forming a wireless transmitter, and terminals 15 to 20 forming wireless receivers.

FIG. 12 is another example of an arrangement of a base station apparatus 11 forming a wireless transmitter, and terminals 15 to 20 forming wireless receivers. The base station apparatus 11 transmits signals to three sectors SC1 to SC3. A plurality of (e.g. three) transmission antennas are installed in each of the sectors SC1 to SC3. This explanation describes a case where there are six terminals 15 to 20 in sector SC1, and each of those terminals 15 to 20 performs wireless communication with the base station apparatus 11.

Terminals 15 to 17 are in group g1, which is a region capable of receiving signals having approximately equal average received power from the base station apparatus 11. Terminals 18 to 20 are in group g2, which is a region capable of receiving signals having approximately equal average received power from the base station apparatus 11. Viewed from the transmission antennas, groups g1 and g2 lie in approximately the same direction. Although the average received powers of the terminals 15 to 20 differ, the waveforms of their frequency characteristics are similar.

Figure 13:
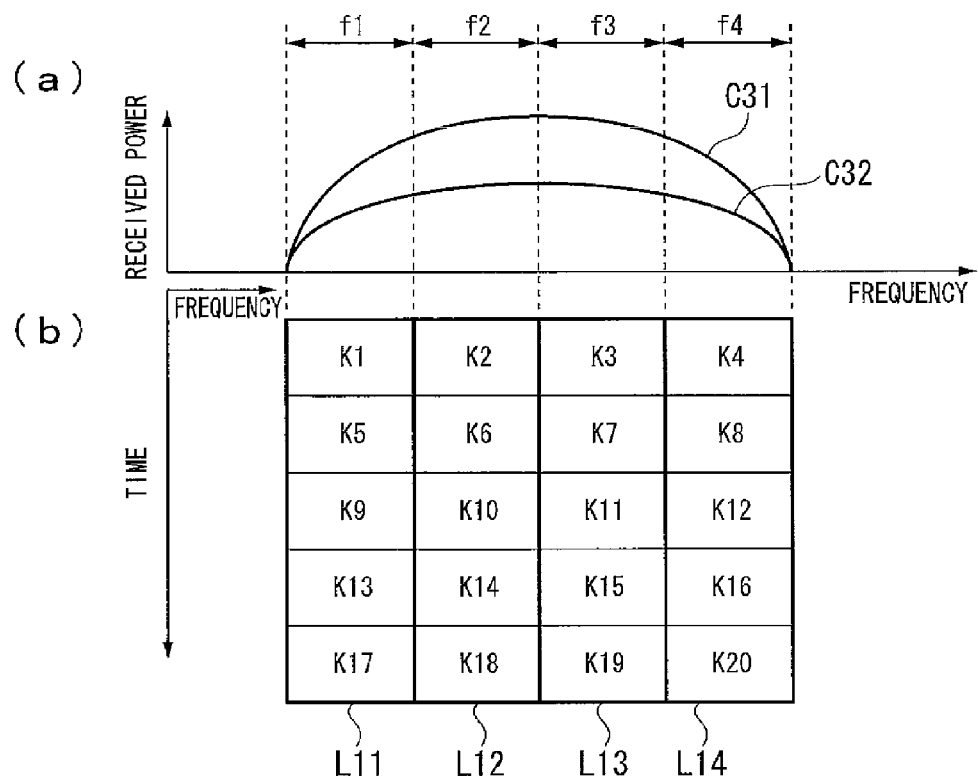
FIG. 13 is an explanatory diagram of a signal observed at terminals 15 to 20 (FIG. 12) forming wireless receivers according to this embodiment.

FIG. 13 is an explanatory diagram of a signal observed at terminals 15 to 20 (FIG. 12) forming wireless receivers according to this embodiment. In FIG. 13, (a) depicts transfer functions C31 and C32 observed in a multi-user diversity region. In FIG. 13 (a), the horizontal axis represents frequency, and the vertical axis represents received power.

In FIG. 13 (b), the horizontal axis represents frequency, and the vertical axis represents time. This example describes a case where communication is performed after assigning chunks K1 to K20 to the users. Since the assignment of the chunks K1 to K20 into groups L11 to L14, and the assignment of groups L11 to L14 into frequency diversity regions and multi-user diversity regions, are the same as in FIG. 10 (c), they will not be repetitiously explained.

Terminals 15 to 20 observe reception quality of groups L11 and L13 which are assigned as multi-user diversity regions. At terminals 15 to 17, a transfer function C31 such as that shown in FIG. 13 (a) is observed. At terminals 17 to 19, a transfer function C32 such as that shown in FIG. 13 (a) is observed. While the average received powers of transfer functions C1 and C32 are different, their waveforms are almost the same.

Figure 14:
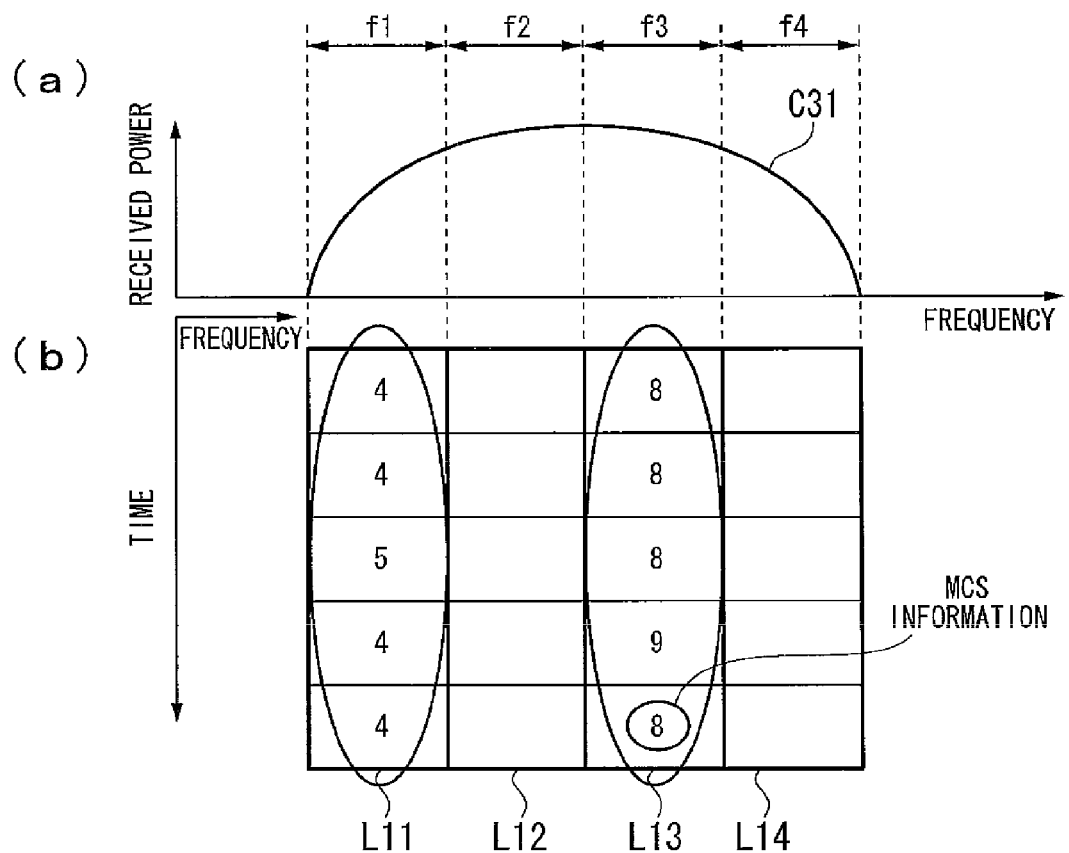
FIG. 14 is an explanatory diagram of a signal received by terminals 15 to 17.

FIG. 14 is an explanatory diagram of a signal received by terminals 15 to 17. In FIG. 14, (a) shows a diagram of the transfer function C31 observed by terminals 15 to 17, where the horizontal axis represents frequency, and the vertical axis represents received power. In FIG. 14, (b) shows an example of modulation and coding scheme (MCS) information of each chunk observed by terminals 15 to 17.

Chunks K1, K5, K9, K13, and K17, belonging to group L11, receive MCS information having sizes of 4, 4, 5, 4, and 4 respectively. Chunks K3, K7, K11, K15, and K119, belonging to group L13, receive MCS information having sizes of 8, 8, 8, 9, and 8 respectively. The higher the numerical value of the MCS information, the better its reception quality.

Figure 15:
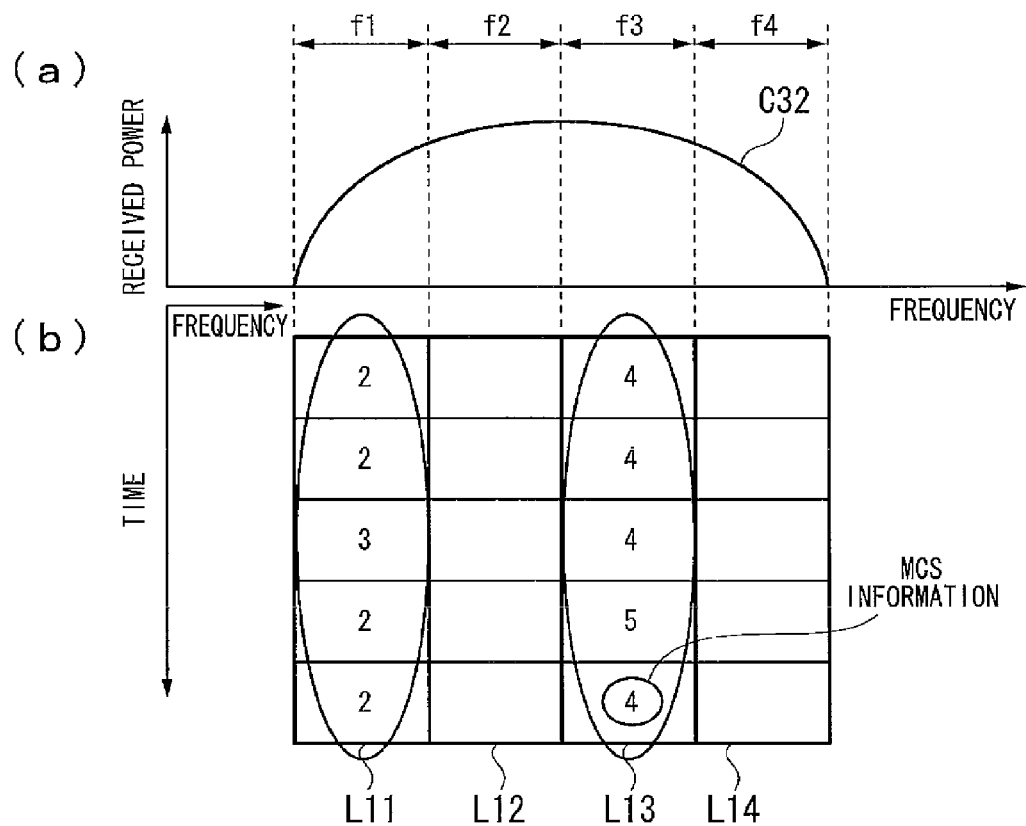
FIG. 15 is an explanatory diagram of a signal received by terminals 18 to 20.

FIG. 15 is an explanatory diagram of a signal received by terminals 18 to 20. In FIG. 15, (a) shows a transfer function C32 observed by terminals 18 to 20, with the horizontal axis representing frequency, and the vertical axis representing received power, In FIG. 15, (b) shows an example of MCS information of each chunk observed by terminals 18 to 20.

Chunks K1, K5, K9, K13, and K17, belonging to group L11, receive MCS information having sizes of 2, 2, 3, 2, and 2 respectively. Chunks K3, K7, K11, K15, and K19, belonging to group L13, receive MCS information having sizes of 4, 4, 4, 5, and 4 respectively.

FIG. 16 is an example of MCS information. Here, the modulation scheme (quadrature phase shift keying (QPSK) etc.), the coding rate (1/8 etc.), and the transmission speed (1.942 Mbps, etc.) are determined in accordance with the MCS information (1 etc.). As is clearly from in FIG. 16, as the requested transmission speed at the terminal increases, the value of the MCS information also increases. As clear from FIG. 14 (b) and FIG. 15 (b), the frequency regions with good reception quality observed by terminals 15 to 17 and terminals 18 to 20 are each in frequency band f3. Terminals 15 to 20 are thus all assigned to the same frequency band. Since the frequency bands f1 to f4 have five chunks assigned in the time axis direction, if six terminals are assigned for these five chunks, there will inevitably be one terminal that cannot be assigned to the group L13 of chunks K3, K7, K11, K15, and K19 having good reception quality.

To solve this problem, in this embodiment, chunks with poor reception quality are phase-controlled, changing them from chunks with poor reception quality to chunks with good reception quality, and terminals are then assigned to them. If there are n transmission antennas, phase-control denotes performing phase-rotation of at least one transmission antenna and at a maximum of n−1 transmission antennas, and inverting the codes of subcarrier signals of the corresponding transmission antennas.

FIGS. 17A, 17B, and 17C are explanatory diagrams of a phase-control method according to this embodiment. In this example, a wireless transmitter includes two transmission antennas ant1 and ant2, and a wireless receiver includes a reception antenna ant3. H1 represents a transfer function between transmission antenna ant1 and reception antenna ant3, and H2 represents a transfer function between transmission antenna ant2 and reception antenna ant3. Since the same common pilot channel is transmitted from each of the transmission antennas, a transfer function H1+H2, which is a combination of transfer functions H1 and H2, is observed on the receiving side.

FIG. 17B is an example of poor reception quality due to a weak transfer function H1+H2. In this case, when transfer function H2 is rotated by $\pi$, transfer function H1−H2 is observed at the terminal. A transfer function H1+H2 which has not been phase-rotated is smaller than transfer function H1 and transfer function H2, which are weaker. In contrast, a transfer function H1+H2 wherein the transfer function H2 has been phase-rotated is larger than transfer function H1 and transfer function H2, which are stronger, and achieves enhanced reception quality at the wireless receiver.

Figure 18:
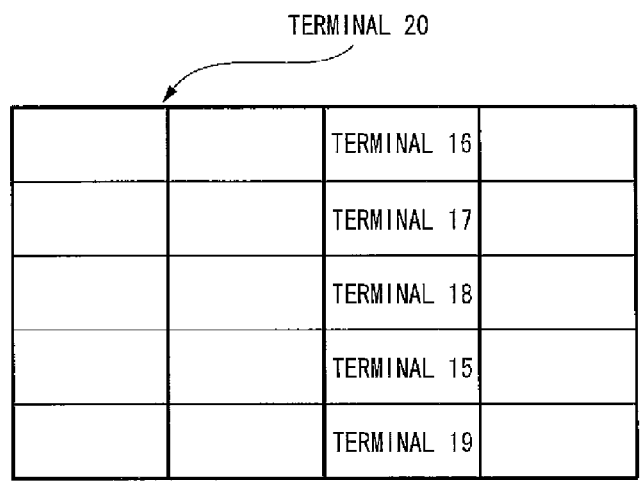
FIG. 18 is an explanatory diagram of a method of assigning terminals 15 to 20 to chunks.

FIG. 18 is an explanatory diagram of a method of assigning terminals 15 to 20 to chunks. In this example, terminals 15 to 17 have high values for MCS information in frequency band f3 of FIG. 14 (b), and terminals 18 to 20 have high values for MCS information in frequency band f3 of FIG. 15 (b). In this embodiment, terminals are assigned to frequency band f3 in descending order of their MCS values. That is, terminals 15 to 19 are sequentially assigned to chunks K15, K3, K7, K11, and K19.

When the value of MCS information observed by terminal 20 is the lowest, terminal 20 cannot be assigned to frequency band f3 of high-value MCS information. At this time, the base station apparatus 11 assigns terminal 20 to a chunk belonging to frequency band f1 having low-value MCS information, performs phase-control of that chunk, and thereby obtains a multi-user diversity effect.

Figure 19:
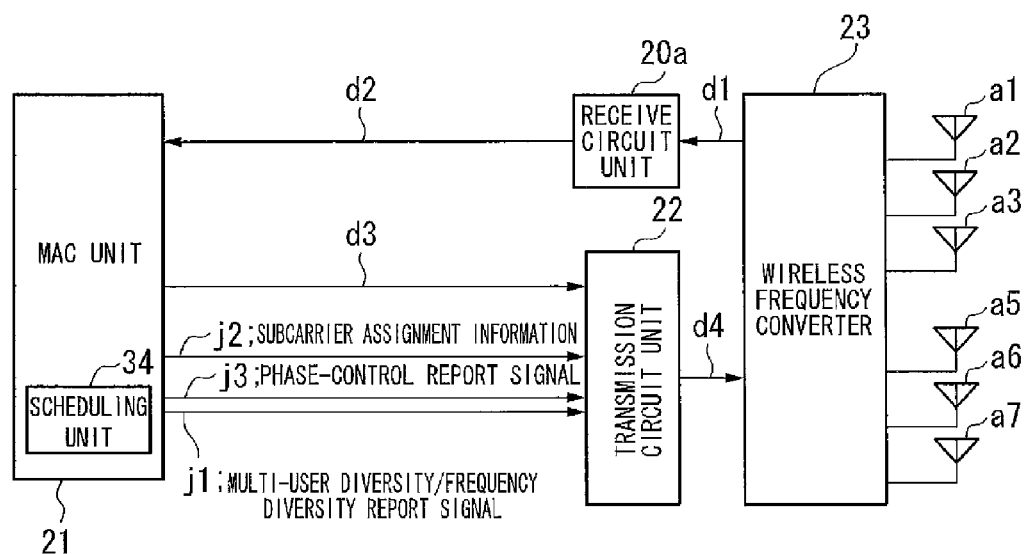
FIG. 19 is a block diagram of the configuration of a base station apparatus 11 according to a first embodiment of the invention.

FIG. 19 is a block diagram of the configuration of a base station apparatus 11 according to a first embodiment of the invention. The base station apparatus 11 receives signals transmitted from a plurality of terminals at reception antennas a1 to a3. A wireless frequency converter 23 performs a frequency conversion process to signals received by the reception antennas a1 to a3, and outputs them as a signal d1 to a receive circuit unit 20a. The receive circuit unit 20a demodulates the signal d1 output from the wireless frequency converter 23, and outputs the result as a signal d2 to a media access control (MAC) unit 21 (transmission circuit controller). The MAC unit 21 controls a transmission circuit unit 22 based on a multi-user diversity/frequency diversity report signal j1 that determines, with respect to each chunk in a frame, whether to make that chunk a frequency diversity region or a multi-user diversity region, subcarrier assignment information j2 that is output from a scheduling unit 34 which performs scheduling based on MCS information received from a terminal, and a phase-control report signal j3 that determines whether to phase-control a chunk. The matter of which chunk to make a multi-user diversity region or a frequency diversity region, based on the multi-user diversity/frequency diversity report signal j1, is determined beforehand by a manager or the like of the base station apparatus 11.

The MAC unit 21 outputs a signal d3 for transmission from the wireless transmitter to the wireless receiver to the transmission circuit unit 22. A signal d4 output from the transmission circuit unit 22 is converted to a wireless frequency by the wireless frequency converter 23, and is transmitted from transmission antennas a5 to a7.

The base station apparatus 11 forming a wireless transmitter transmitted according to this embodiment includes three transmission antennas, and the MAC unit 21 (transmission circuit controller) transmits the multi-user diversity/frequency diversity report signal j1. Based on MCS information (reception quality) reported from the terminal forming the wireless receiver, the MAC unit 21 assigns a chunk to each terminal, and transmits the phase-control report signal j3. Based on the multi-user diversity/frequency diversity report signal j1 or the phase-control report signal j33 the transmission circuit unit 22 appends different delays to each of the three transmission antennas.

Figure 20:
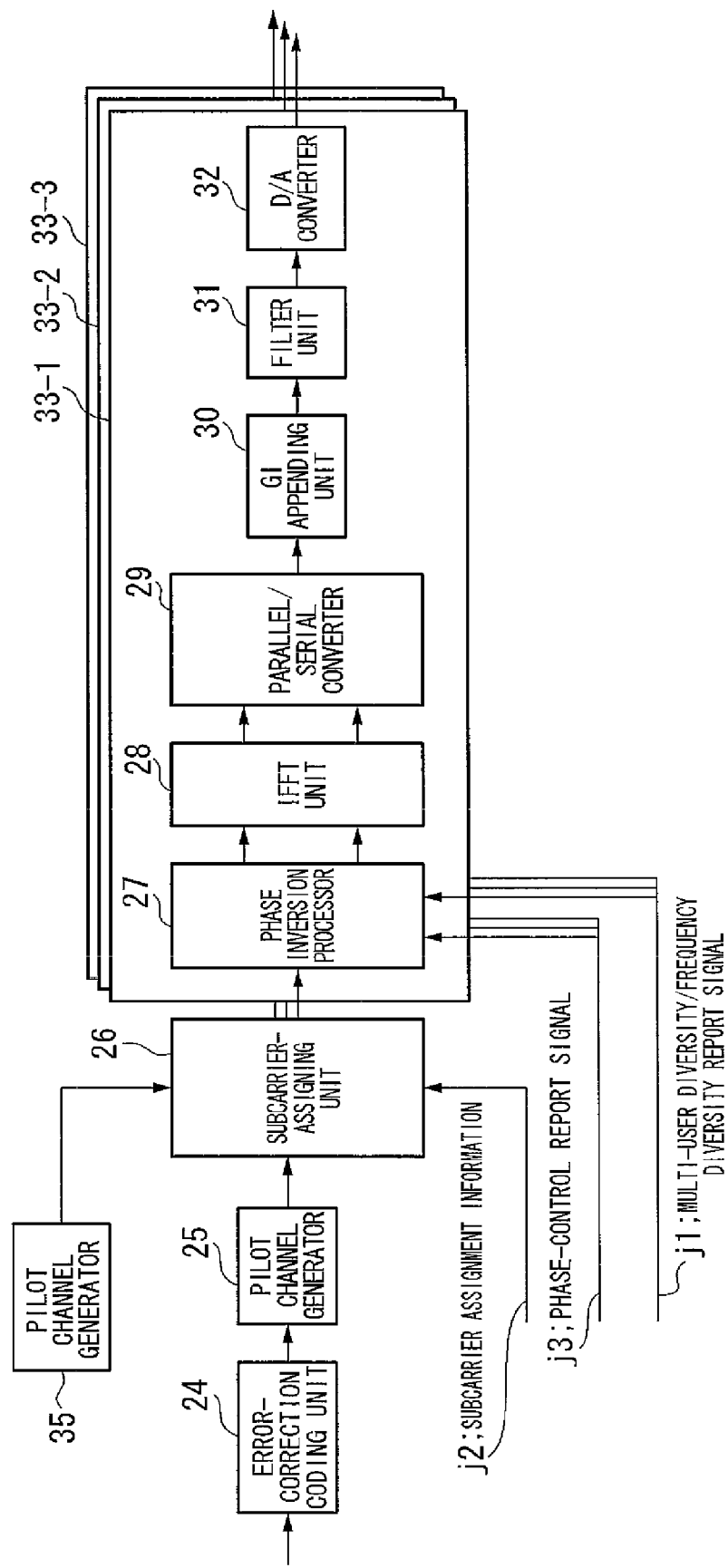
FIG. 20 is a block diagram of the configuration of a transmission circuit unit 22 (FIG. 19) according to a first embodiment of the invention.

FIG. 20 is a block diagram of the configuration of the transmission circuit unit 22 (FIG. 19) according to a first embodiment of the invention. The transmission circuit unit 22 includes an error-correction coding unit 24 that performs error-correction coding of transmit data, a modulator 25 that performs modulation such as QPSK of the output from the error-correction coding unit 24, a subcarrier-assigning unit 26 that assigns terminals to the subcarriers, and transmission antenna circuits 33-1, 2, and 3 that, using the output of the subcarrier-assigning unit 26, generate signals for transmission by each transmission antenna.

The transmission antenna circuits 33-1, 2, and 3 append a delay time to each of the transmission antennas by performing a phase-inversion process at a phase inversion processor 27, based on the multi-user diversity/frequency diversity report signal j1 and the phase-control report signal j3; the output of the phase inversion processor 27 is converted to a time signal in an inverse fast Fourier transform (IFFT) unit 28, a parallel/serial converter 29 makes a parallel/serial conversion of the output of the IFFT unit 28, a guard interval (GI) appending unit appends a GI to the output of the series converter 29, a filter unit 31 extracts a desired signal from the output of the GI appending unit 30, and a digital/analog (D/A) converter 32 performs a digital/analog conversion.

The subcarrier-assigning unit 26 performs a process of assigning a common pilot channel, generated by a pilot channel generating unit 25, to each subcarrier. Since chunks in a frame are grouped into multi-user diversity regions and frequency diversity regions, if the chunks are provided with a common pilot channel, in multi-user diversity regions, a maximum delay difference for each transmission antenna of no more than $1/F_c$ is appended, and in frequency diversity regions, a maximum delay difference for each transmission antenna of no less than $1/F_c$ is appended, prior to transmission. Therefore, the terminal can measure the reception quality of each transmission diversity effect by observing the common pilot channels arranged in each chunk.

Figures 21, 22:
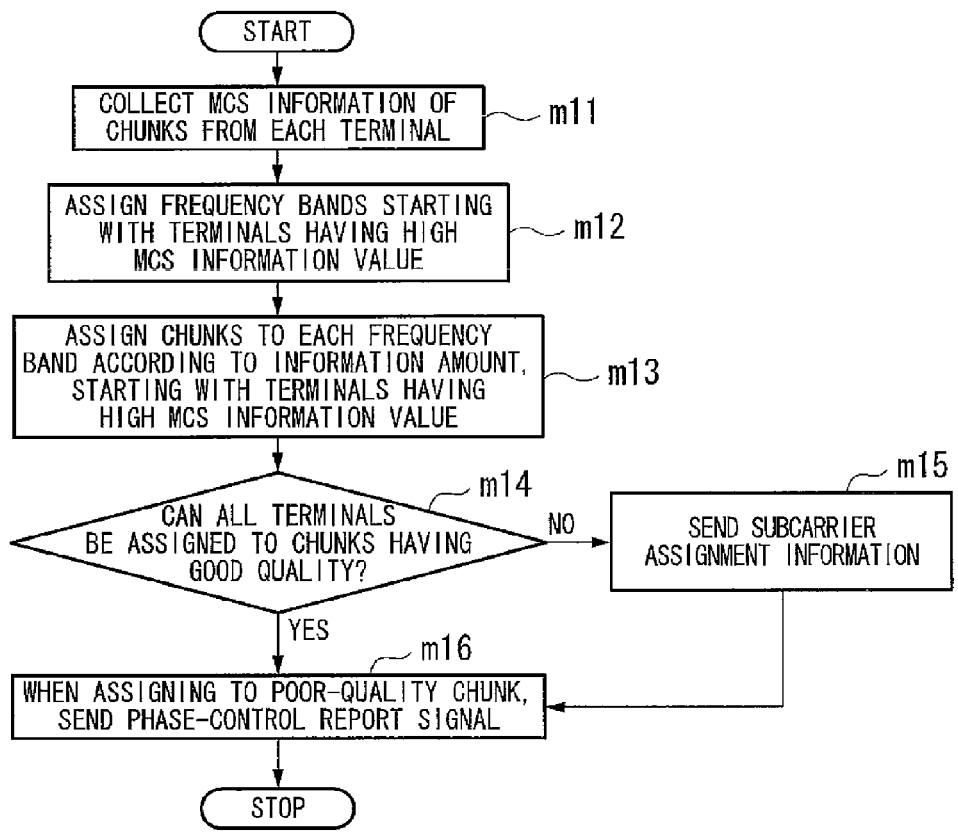
FIG. 21 is an explanatory diagram of a process of the phase inversion processor 27 (FIG. 20) according to a first embodiment of the invention.
FIG. 22 is a flowchart of a process of a scheduling unit 34 (FIG. 19) according to a first embodiment of the invention.

FIG. 21 is an explanatory diagram of a process of the phase inversion processor 27 (FIG. 20) according to a first embodiment of the invention. In this example, the phase inversion processor 27 is notified to use multi-user diversity by the multi-user diversity/frequency diversity report signal j1, and notified to control the phase by using the transmission antenna 4 (FIG. 1) by the phase-control report signal j3. Here, the wireless transmitter includes three transmission antennas. In FIG. 21, $\theta_k$ ($=2\pi dk/N$) represents the phase rotation amount in subcarrier number k. N is the point number of an inverse fast Fourier transform (FFT), d is a delay point of no more than $1/F_c$, and $F_c$ is the frequency bandwidth per chunk.

Since the multi-user diversity/frequency diversity report signal j1 specifies multi-user diversity, a delay difference of no more than $1/F_c$ is applied the transmission antenna 4, where the maximum delay difference is applied. Since there is no phase control between terminals 15 and 19 in FIG. 18, the phase rotation amount at each transmission antenna is 0 at transmission antenna 2 (FIG. 1), $\theta_k/2$ at transmission antenna 3, and $\theta_k$ at transmission antenna 4. At terminal 20 in FIG. 18, due to the notification to perform phase-control by the phase-control report signal j3, the phase rotation of $\theta_k$ is further rotated by $\pi$. When a terminal is assigned to a frequency diversity region, d in FIG. 21 becomes a delay point of no less than $1/F_c$, and a maximum delay time of no less than $1/F_c$ is appended at transmission antenna 4 which applies the maximum delay.

FIG. 22 is a flowchart of a process of the scheduling unit (FIG. 19) according to a first embodiment of the invention. Firstly, the base station apparatus 11 collects MCS information contained in the CQI information reported from the terminals (step m11). Based on the MCS information collected from the terminals, frequency bands are assigned starting with the terminal having the highest value (step m12). In each frequency band, chunks are assigned according to the information amount, starting with the terminal having the highest MCS information value (step m13). It is determined whether all terminals can be assigned to chunks belonging to frequency bands having good reception quality (step m14). When it is possible, the subcarrier assignment information j2 is sent to the transmission circuit unit 22 (step m16), and the process ends. When it is not possible, that terminal is assigned to a chunk belonging to a frequency band having poor reception quality, and a phase-control report signal j3 is sent to that chunk (step m15). The subcarrier assignment information j2 is then sent to the transmission circuit unit 22 (step m16), and the process ends.

As described above, when assigning a chunk that belongs to a frequency band having poor reception quality to a terminal forming a wireless receiver, the wireless transmitter of this embodiment sends the phase-control report signal j3 (step m15).

One example of a method of determining whether reception quality is good or poor is to set frequency bands other than the one having the best reception quality as 'frequency bands having poor reception quality' in the MAC unit 21 (transmission circuit controller). Alternatively, frequency bands having reception quality that is below a predetermined threshold, determined based on the reception quality in the frequency band having the worst reception quality, are set as 'frequency bands having poor reception quality' in the MAC unit 21 (transmission circuit controller). The predetermined threshold can, for example, be one-half of the reception quality in the frequency band having the best reception quality.

As MCS information used when assigning to a frequency band having poor reception quality, it is possible to use MCS information of good reception quality, or MCS information that lies between MCS information of good quality and MCS information of poor quality.

While in this embodiment, reception quality is measured by observing the common pilot channel, instead of a common pilot channel, the reception quality can be measured by using another type of channel such as a dedicated pilot channel (DPC). A dedicated pilot channel is a pilot channel that is temporarily provided at one wireless receiver, which uses it for propagation path estimation. A common pilot channel is a pilot channel that is permanently provided at a plurality of wireless receivers, which share it for propagation path estimation.

According to the wireless transmitter of the first embodiment, by assigning chunks based on reception quality at a terminal forming a wireless receiver, when a terminal has poor reception quality, weakened signals can be changed to strong signals by phase-control, enhancing the reception quality when the terminal receives a signal from a wireless transmitter.

Second Embodiment

In the first embodiment, phase-control was performed when assigning a terminal to a chunk having poor reception quality. However, since the phase-control method sometimes makes the reception quality even worse (FIG. 17B), in this embodiment a determination is made whether to perform phase-control in chunks where reception quality is worse than chunks with good reception quality.

Figure 23:
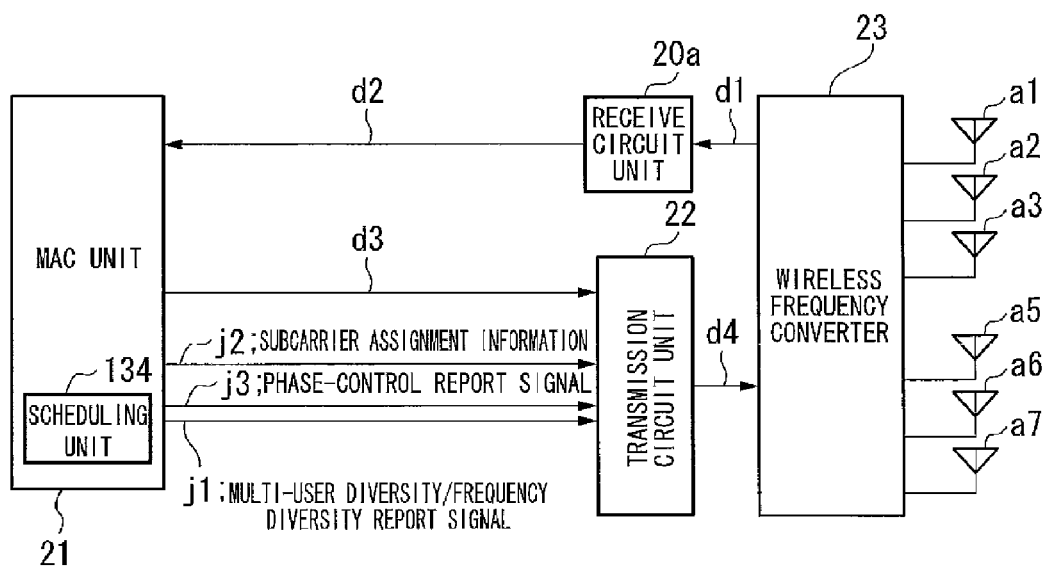
FIG. 23 is a block diagram of the configuration of a base station apparatus 11 according to a second embodiment of the invention.

FIG. 23 is a block diagram of the configuration of a base station apparatus 11 according to a second embodiment of the invention. As in FIG. 19, a transmission circuit unit 22 is controlled by a subcarrier assignment information j2, a phase-control report signal j3, and a multi-user diversity/frequency diversity report signal j1, which are output from a MAC unit 21. Of these signals j1 to j3, the subcarrier assignment information j2 and the phase-control report signal j3 are output from a scheduling unit 134 of the MAC unit 21. The configuration is otherwise the same as that of the base station apparatus 11 according to the first embodiment (FIG. 19), and will not be further explained.

Figure 24:
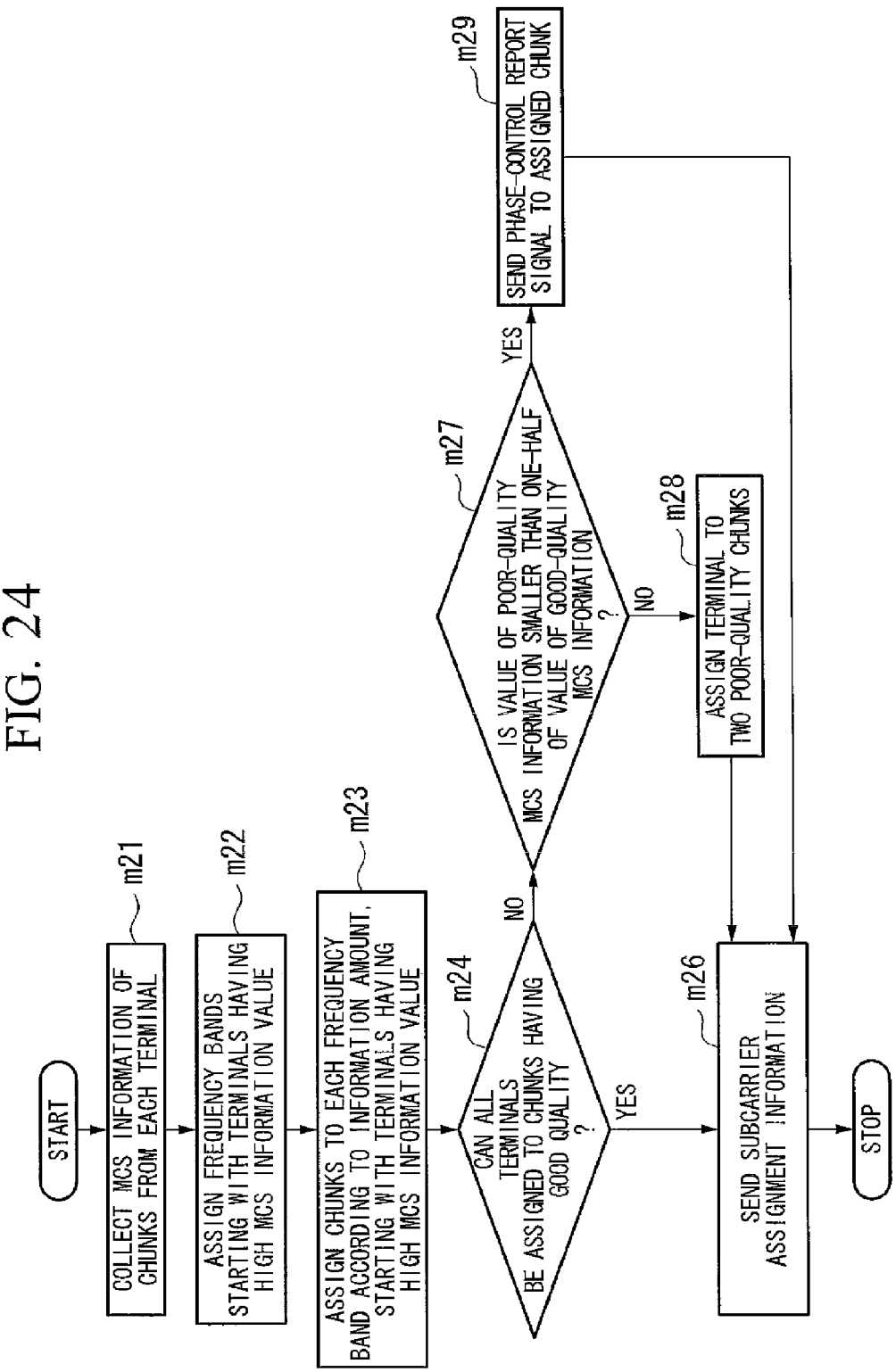
FIG. 24 is a flowchart of a process of the scheduling unit 134 (FIG. 23) according to the second embodiment of the invention.

FIG. 24 is a flowchart of a process of the scheduling unit 134 (FIG. 23) according to the second embodiment of the invention. Firstly, the base station apparatus 11 collects MCS information relating to chunk transmitted from each terminal (step m21). Frequency bands are assigned starting with terminals whose MCS information has a high value (step m22). Chunks are also assigned to each frequency band, starting with terminals whose MCS information has a high value (step m23). It is determined whether all terminals can be assigned to frequency bands with good reception quality (step m24). When such assignment is possible, the subcarrier assignment information j2 is sent to the transmission circuit unit 22, and the process ends (step m26). When such assignment is not possible, if the value of poor-quality MCS information is determined to be no less than one-half of the value of the good-quality MCS information (step m27), that single terminal is assigned to two chunks belonging to a poor-quality frequency band (step m28), the subcarrier assignment information j2 is sent to the transmission circuit unit 22, and the process ends. On the other hand, if the value of poor-quality MCS information is determined to be less than one-half of the value of the good-quality MCS information (step m27), the phase-control report signal j3 is sent to one transmission antenna (step m29), the subcarrier assignment information j2 is sent to the transmission circuit unit 22, and the process ends (step m26).

Subsequently, advantages of performing phase-control, not to a chunk having relatively poor reception quality, but to chunks having definitely poor reception quality, will be explained.

Figure 25A:
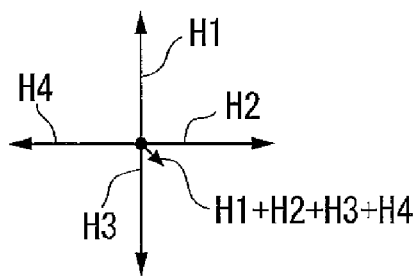
FIG. 25A is an explanatory diagram of reception signal quality at a wireless receiver when a wireless transmitter includes four transmission antennas.
Figure 25B:
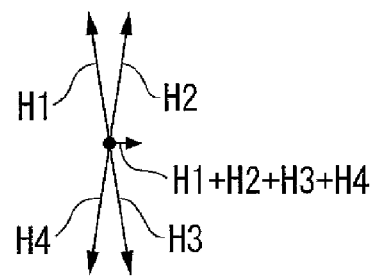
FIG. 25B is an explanatory diagram of reception signal quality at a wireless receiver when a wireless transmitter includes four transmission antennas.
Figure 26A:
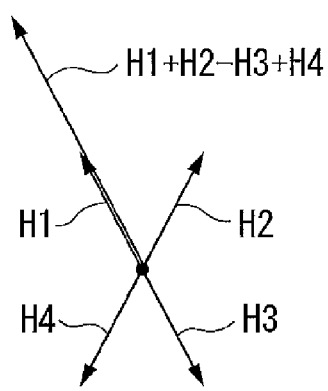
FIG. 26A is an explanatory diagram of reception signal quality at a wireless receiver when a wireless transmitter includes four transmission antennas.

FIGS. 25A, 25B, 26A, and 26B are explanatory diagrams of quality of reception signals at a wireless receiver when a wireless transmitter includes four transmission antennas. In FIGS. 25A and 25B, reference numerals H1 to H4 represent the four transmission antennas of the wireless transmitter, and transfer functions between reception antennas of the wireless receiver. In the examples shown in FIGS. 25A and 25B, the size of the vector sum (H1+H2+H3+H4) of the transfer functions H1 to H4 is close to 0, and reception quality at the wireless receiver worsens. In this case, the reception quality at the wireless receiver can be enhanced by performing phase-control at one transmission antenna. For example, in FIG. 25B, if the transfer function H3 is inverted by a rotation of $\pi$, as shown in FIG. 26A, the size of the vector sum (H1+H2+H3+H4) of the transfer functions H1 to H4 is not close to 0, and reception quality at the wireless receiver can be enhanced. Thus in the wireless receiver of this embodiment, when a report to perform phase-control is made by sending the phase-control report signal j3, transmission antenna circuits 33-1, 2, and 3 perform phase-control of one of the three transmission antennas.

Figure 26B:
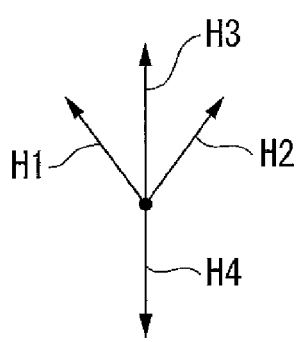
FIG. 26B is an explanatory diagram of reception signal quality at a wireless receiver when a wireless transmitter includes four transmission antennas.

When phase-control is performed with the transfer functions H1 to H3 shown in FIG. 26B, there is a high probability that characteristics will deteriorate. If one of transfer functions H1 to H3 is inverted by a rotation of $\pi$, the size of the vector sum of the transfer functions is close to 0, and reception quality at the wireless receiver worsens. That is, in FIG. 26B, there is no need to perform phase-control, since desired throughput can be achieved by increasing the chunks used instead.

FIGS. 27A, 27B, 28A, and 28B are explanatory diagrams of a process of the scheduling unit 134 according to the second embodiment of the invention. In FIG. 27 (a) and FIG. 28A (a), a transfer function C41 between the wireless transmitter and the wireless receiver is shown with frequency represented along the horizontal axis, and received power along the vertical axis. In both FIG. 27A (a) and FIG. 28A (a), transfer function C41 has a high average value, and reception quality at the wireless receiver is poor.

Figure 28B:
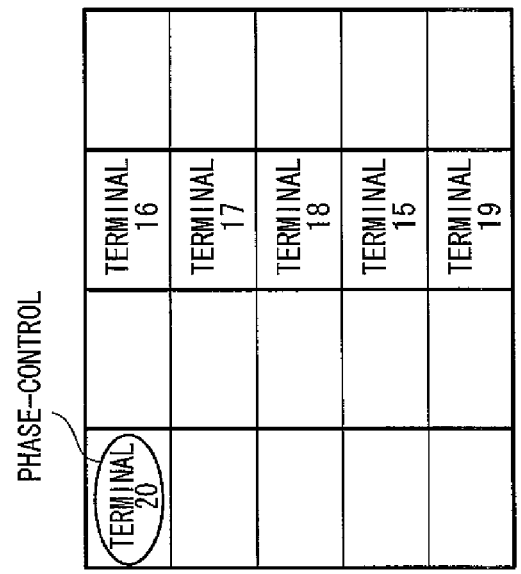
FIG. 28B is a diagram of a method of assigning terminals 15 to 20 to groups L11 and L13 that belong to frequency bands f1 and B3, which have been assigned as multi-user diversity regions
Figure 28A:
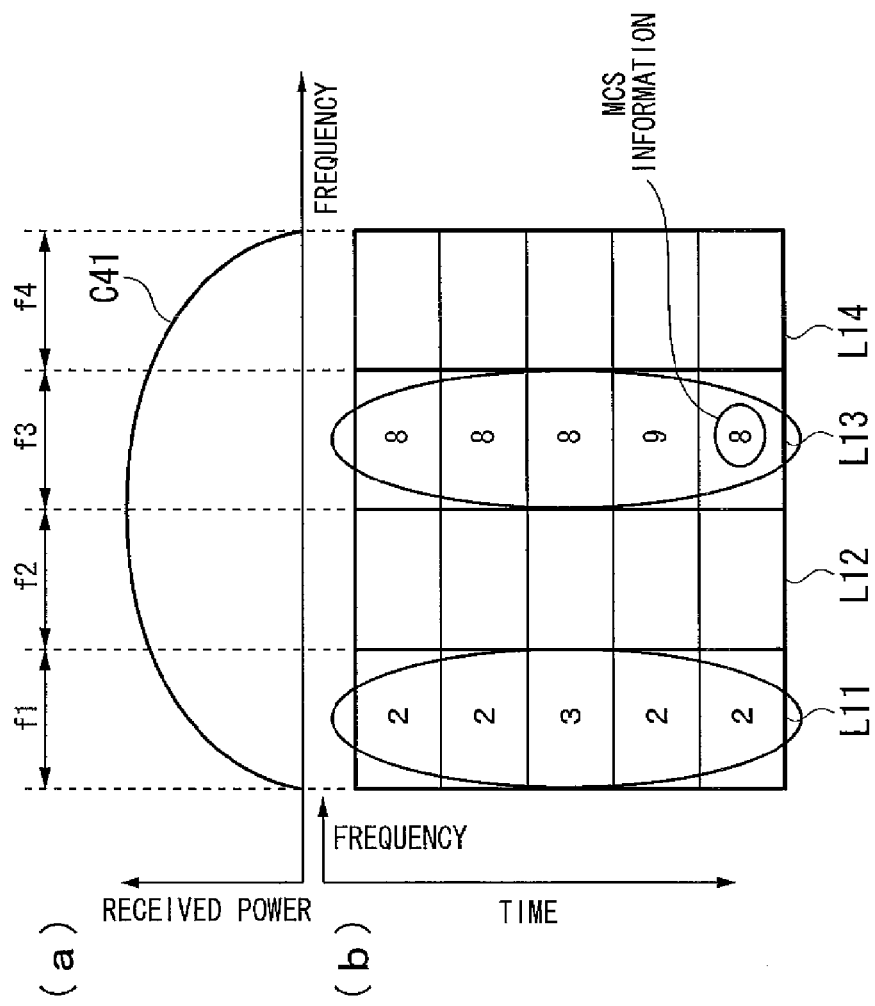
FIG. 28A is an explanatory diagram of a process of a scheduling unit 134 according to the second embodiment of the invention.

FIG. 27A (b) and FIG. 28A (b) are values of MCS information at the wireless receiver in groups L11 and L13 which multi-user diversity has been assigned to. The horizontal axis represents frequency, and the vertical axis represents time. The higher the value of the MCS information, the better the reception quality.

FIGS. 27B and 28B are methods of assigning terminals 15 to 20 to the groups L1 and L13 that belong to frequency bands f1 and f3, which have been assigned as multi-user diversity regions. In FIGS. 27B and 28B, terminals 15 to 19 are assigned to group L13, which belongs to a frequency band f2 having a transfer function 41 of high received power. That is, terminals 15 to 19 are assigned sequentially to chunks K5, K3, K7, K11, and K19. Terminal 20, on the other hand, cannot perform communication using group L13 which has good reception quality, since all five of the chunks that belong to group L13 are occupied.

As shown in FIG. 27B, the values of the MCS information of group L13 belonging to the frequency band with good reception quality are 8 and 9, and the values of the MCS information of group L11 belonging to the frequency band with poor reception quality are 4 and 5. In this case, if two chunks having poor reception quality (e.g. chunks K5 and K9) are assigned to terminal 20 without performing phase-control, their reception quality will be the same as that of the good-quality chunks. The wireless transmitter according to this embodiment, when the MAC unit 21 (transmission circuit controller) assigns a chunk belonging to a frequency band having poor reception quality to a terminal forming a wireless receiver, it assigns a plurality of chunks to that terminal.

When assigning a plurality of chunks belonging to the frequency band having poor reception quality to terminal 20, in selecting a plurality of chunks belonging to which time band of that frequency band, for example, the MAC unit 21 selects a plurality of chunks such that the total reception quality values of the plurality of chunks belonging to the frequency band having poor reception quality becomes approximately the same as the average reception quality value in a frequency band having good reception quality.

As shown in FIG. 28B, if the reception quality itself is poor, as in the case of the values of the MCS information of group L11 belonging to the frequency band with poor reception quality, which are 2 and 3, by performing phase-control for one of the transmission antennas in the wireless transmitter, the reception quality at the wireless receiver can be enhanced as described in FIG. 26A.

The case described in this embodiment, where one-half of the value of MCS information having good reception quality denotes a state of poor reception quality, is merely one example; generally, if Q1 represents good reception quality, Q2 represents poor reception quality, and the predetermined threshold is a, Q2 can be deemed to be poor reception quality when Q2<α×Q1(0<α<1). Here, throughput information is used as the reception qualities Q1 and Q2. Throughput information affects throughput during communication, and includes MCS, signal to interference and noise ratio (SINR), received power, etc.

According to the wireless receiver in the second embodiment of the invention, since the number of chunks assigned to terminals that perform communication using a frequency band having poor reception quality is made larger than the number of chunks assigned to terminals that perform communication using a frequency band having good reception quality, communication can be performed while maintaining the same communication quality at all terminals, irrespective of whether the reception quality in that frequency band is good or bad.

Third Embodiment

In the second embodiment, there is a possibility that the reliability of the MCS information will be damaged when phase-control is performed. Therefore in this embodiment, to perform highly reliable communication, the reception quality is also measured when phase-control has been performed, and suitable MCS information is determined.

Figure 29:
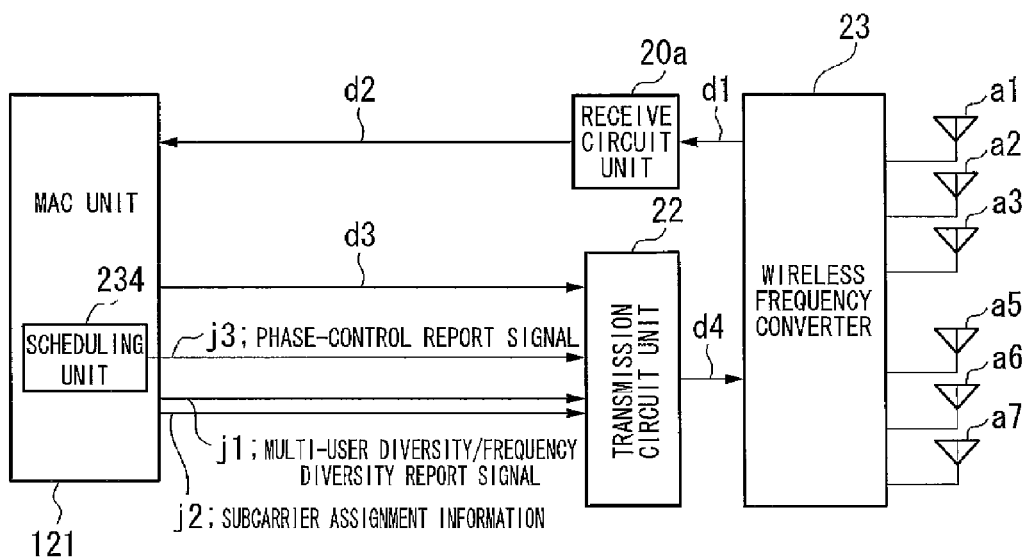
FIG. 29 is a block diagram of the configuration of a base station apparatus 11 according to a third embodiment of the invention.

FIG. 29 is a block diagram of the configuration of a base station apparatus 11 according to a third embodiment of the invention. In FIG. 29, a transmission circuit unit 22 is controlled by multi-user diversity/frequency diversity report signal j1, a phase-control report signal j3, and a subcarrier assignment information j2, which are output from a MAC unit 121. Since the configuration is otherwise the same as that of the base station apparatus 11 according to the first embodiment (FIG. 19), it will not be explained further.

Figure 30:
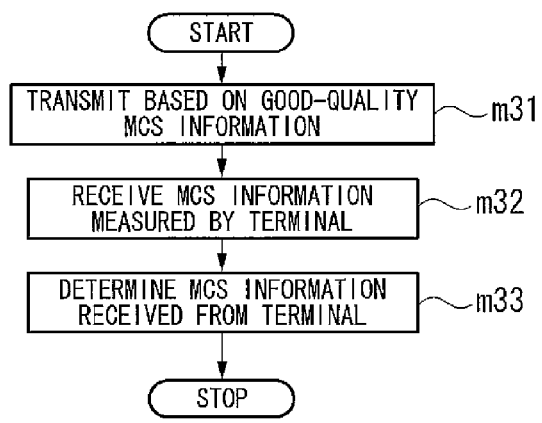
FIG. 30 is a flowchart of a process of a scheduling unit 234 (FIG. 29) according to the third embodiment of the invention.

FIG. 30 is a flowchart of a process of a scheduling unit 234 (FIG. 29) according to the third embodiment of the invention. This example describes a case where, to assign a terminal to a chunk belonging to a frequency band having poor quality, the base station apparatus 11 determines to perform phase-control. In this case, the scheduling unit 234 generates a phase-control report signal j3 making a command to perform phase-control at one of the transmission antennas, and sends to the transmission circuit unit 22. It also transmits MCS information of chunks belonging to frequency bands having good reception quality when the base station apparatus 11 assigns the terminal to a chunk (step m31). The terminal observes the common pilot channel, measures the multi-user diversity effect after phase-control is performed, and reports the MCS information to the base station apparatus 11.

The base station apparatus 11 receives the MCS information sent from the terminal (step m32), and, based on this MCS information, determines to use the MCS information reported from the terminal in the next transmission.

Figure 31:
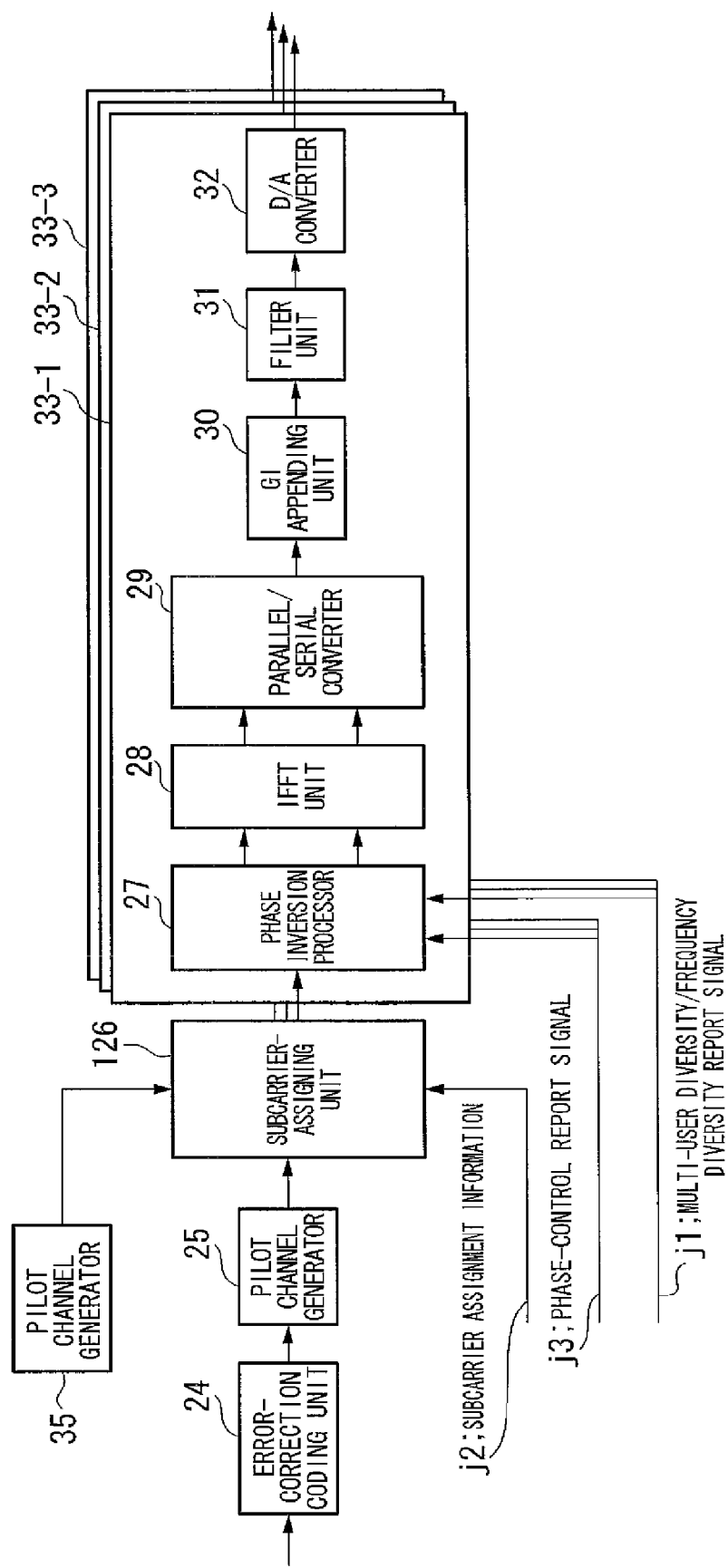
FIG. 31 is a block diagram of the configuration of a transmission circuit unit 22 (FIG. 29) according to the third embodiment of the invention.

FIG. 31 is a block diagram of the configuration of a transmission circuit unit 22 (FIG. 29) according to the third embodiment of the invention. After processing in a modulator 25, the output of the modulator 25 is assigned to a subcarrier that corresponds to a chunk assigned by a subcarrier-assigning unit 126. The subcarrier-assigning unit 126 also assigns a common pilot channel that is generated by a pilot channel generator 25. The output of the subcarrier-assigning unit 126 is input to transmission antenna circuits 33-1, 2, and 3.

Based on the phase-control report signal j3, the transmission antenna circuits 33-1, 2, and 3 perform phase-control in a phase inversion processor 27 of one transmission antenna circuit. The output of the phase inversion processor 27 is processed by an IFFT unit 28, a parallel/serial converter 29, a GI appending unit 30, a filter unit 31, and a D/A converter 32, before being input to the wireless frequency converter 23 (FIG. 29).

According to the wireless receiver in the third embodiment of the invention, by measuring the multi-user diversity effect for a phase-controlled signal, communication based on accurate MCS information can be performed between the wireless transmitter and the wireless receiver.

Fourth Embodiment

The second and third embodiments describe cases where one transmission antenna performs phase-control. The second and third embodiments enhance reception quality when a wireless transmitter includes three transmission antennas. However, when the wireless transmitter includes many transmission antennas, e.g. more than four, the reception quality enhancement effect decreases. Accordingly in this embodiment, the multi-user diversity effect is measured in a plurality of phase-control patterns, and an optimum phase-control pattern is selected. In the wireless transmitter according to this embodiment, based on MCS information (reception quality) transmitted from a terminal forming a wireless receiver, the MAC unit 221 (transmission circuit controller) compares the reception qualities of the phase-control patterns, and selects one that has the best reception quality.

As in the second and third embodiments, in performing phase-control, this embodiment uses a state where reception quality of the chunks is definitely poor.

FIGS. 32A, 32B, 32C, and 32D are explanatory diagrams of reception quality when a wireless transmitter includes two and three transmission antennas.

Figure 32A:
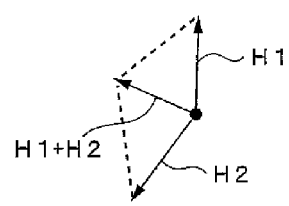
FIG. 32A is an explanatory diagram of reception quality when a wireless transmitter includes two and three transmission antennas.
Figure 32B:
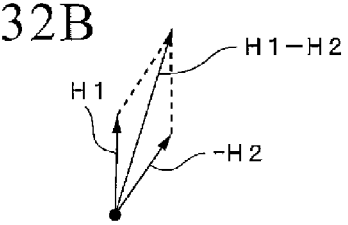
FIG. 32B is an explanatory diagram of reception quality when a wireless transmitter includes two and three transmission antennas.

FIGS. 32A and 32B are explanatory diagrams of reception quality when a wireless transmitter includes two transmission antennas. In FIG. 32A, two transmission antennas have transfer functions H1 and H2. As shown in FIG. 32B, by rotating one of H1 and H2 by π, the combined sum of the vectors (H1−H2) is made larger than that in FIG. 32A.

Figure 32C:
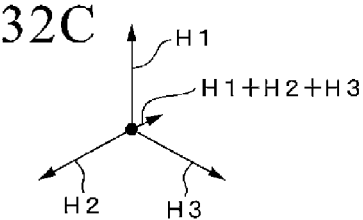
FIG. 32C is an explanatory diagram of reception quality when a wireless transmitter includes two and three transmission antennas.
Figure 32D:
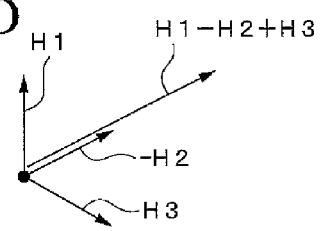
FIG. 32D is an explanatory diagram of reception quality when a wireless transmitter includes two and three transmission antennas.

FIGS. 32C and 32D are explanatory diagrams of reception quality when a wireless transmitter includes three transmission antennas. In FIG. 32C, three transmission antennas have transfer functions H1 to H3. As shown in FIG. 32D, by rotating one of H1 to H3 by π, the combined sum of the vectors (H1−H2+H3) is made larger than that in FIG. 32C.

In the wireless transmitter according to this embodiment, when a phase-control report signal j3 reports a command to perform phase-control, the transmission antenna circuits 33-1, 2, and 3 performs phase-control of at least one of four transmission antennas.

Figure 33:
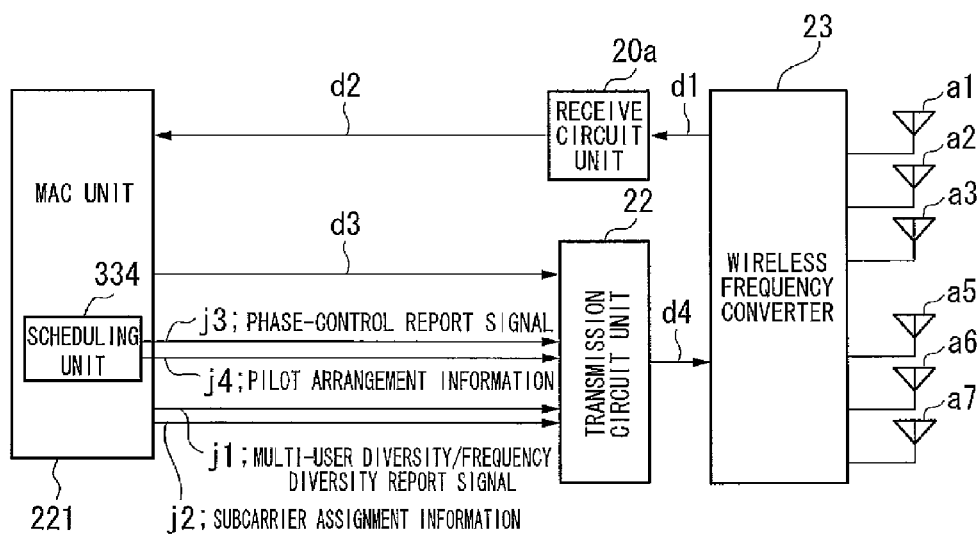
FIG. 33 is a block diagram of the configuration of a base station apparatus 11 according to a fourth embodiment of the invention.

FIG. 33 is a block diagram of the configuration of a base station apparatus 11 according to a fourth embodiment of the invention. In FIG. 33, a transmission circuit unit 22 is controlled by a multi-user diversity/frequency diversity report signal j1, a subcarrier assignment information j2, a phase-control report signal j3, and a pilot arrangement information j4 that includes arrangement information relating to a common pilot channel for measuring the multi-user diversity effect in each phase-control pattern, which are output from a MAC unit 221. Of these signals j1 to j4, the phase-control report signal j3 and the pilot arrangement information 4 are generated by a scheduling unit 334 of the MAC unit 221. Since the configuration is otherwise the same as that of the base station apparatus 11 of the first embodiment (FIG. 19). While the base station apparatus 11 according to the first embodiment includes three reception antennas a1 to a3, and three transmission antennas a5 to a7, the base station apparatus 11 according to this embodiment includes four reception antennas a1 to a4, and four transmission antennas a5 to a8.

In the wireless transmitter according to this embodiment, pilot arrangement information and a phase-control report signal are sent to the transmission circuit unit 22, the reception quality of a terminal forming a wireless receiver which is commanded to perform phase-control by the phase-control report signal j3 is received a second time, and, based on the pilot arrangement information j4, the MAC unit 21 (transmission circuit controller) assigns a pilot channel.

FIG. 34 is a flowchart of a process of a scheduling unit 334 (FIG. 33) according to the fourth embodiment of the invention. Firstly, the base station apparatus 11 performs communication based on MCS information having good reception quality when assigning a terminal to a chunk. Since phase-control is to be performed at one transmission antenna, the scheduling unit 334 generates a phase-control report signal j3 for reporting that fact, and sends it to the transmission circuit unit 22. The terminal measures reception quality by observing a common pilot channel, and also sends the pilot arrangement information j4 to the transmission circuit unit 22 (step m41). The common pilot channel is phase-controlled using a first phase-control pattern. The terminal observes the common pilot channel, determines the reception quality of the multi-user diversity effect using the first phase-control pattern, and reports the MCS information to the base station apparatus 11. The base station apparatus 11 receives the MCS information sent from the terminal (step m42). In the next transmission, the common pilot channel is transmitted using a second phase-control pattern, and the terminal measures the reception quality of the multi-user diversity effect using the second phase-control pattern. The reception qualities of multi-user diversity effects using all phase-control patterns are measured in this way, and the communication is performed using the phase-control that obtains the best MCI among these phase-control patterns. The scheduling unit 334 sends a phase-control report signal j3 that corresponds to the selected phase-control pattern to the transmission circuit unit 22 (step m43).

Thus in the wireless transmitter according to this embodiment, the MAC unit 21 (transmission circuit controller) assigns pilot channels for propagation path estimation to a plurality of chunks, reports the fact that the pilot channel is one of p (p being a natural number) phase-control patterns to the transmission circuit unit 22, and transmits the pilot channel.

FIGS. 35A and 355B are explanatory diagrams of reception quality when a wireless transmitter includes four transmission antennas. In FIG. 35A, the four transmission antennas have transfer functions H1 to H4. In this state, since the vector sum of the transfer functions H1 to H4 is close to 0, reception quality is poor.

As shown in FIG. 35B, to enhance poor reception quality when the wireless transmitter includes four transmission antennas, phase-control is performed at two of the transmission antennas. While 24=16 patterns must be checked to check all phase-control patterns, only three patterns need be checked to select the two optimum transmission antennas for performing phase-control.

Thus the transmission antennas of the wireless transmitter according to this embodiment include a first transmission antenna, a second transmission antenna, a third transmission antenna, and a fourth transmission antenna, there being three phase-control patterns, and the MAC unit 221 (transmission circuit controller) performs phase-control of two transmission antennas from among the first transmission antenna to the fourth transmission antenna.

FIG. 36 is an explanatory diagram of phase-control patterns when the wireless transmitter includes four transmission antennas. Here, the four transmission antennas include the first to the fourth transmission antennas. In FIG. 36, symbol O represents transmission antennas that perform phase-control, and x represents transmission antennas that do not perform phase-control. Since switching O and x in FIG. 36 achieves a similar effect, they can be switched for each phase-control pattern.

The following phase-control patterns (1) to (8) obtain similar effects.

(1) Three patterns of first transmission antenna and second transmission antenna, first transmission antenna and third transmission antenna, first transmission antenna and fourth transmission antenna, (2) three patterns of third transmission antenna and fourth transmission antenna, first transmission antenna and third transmission antenna, and first transmission antenna and fourth transmission antenna, (3) three patterns of first transmission antenna and second transmission antenna, second transmission antenna and fourth transmission antenna, and first transmission antenna and fourth transmission antenna, (4) three patterns of first transmission antenna and second transmission antenna, first transmission antenna and third transmission antenna, and second transmission antenna and third transmission antenna, (5) three patterns of third transmission antenna and fourth transmission antenna, second transmission antenna and fourth transmission antenna, and first transmission antenna and fourth transmission antenna, (6) three patterns of first transmission antenna and second transmission antenna, second transmission antenna and fourth transmission antenna, and second transmission antenna and third transmission antenna, (7) three patterns of third transmission antenna and fourth transmission antenna, first transmission antenna and third transmission antenna, and second transmission antenna and third transmission antenna, (8) three patterns of third transmission antenna and fourth transmission antenna, second transmission antenna and fourth transmission antenna, and second transmission antenna and third transmission antenna.

Figure 37:
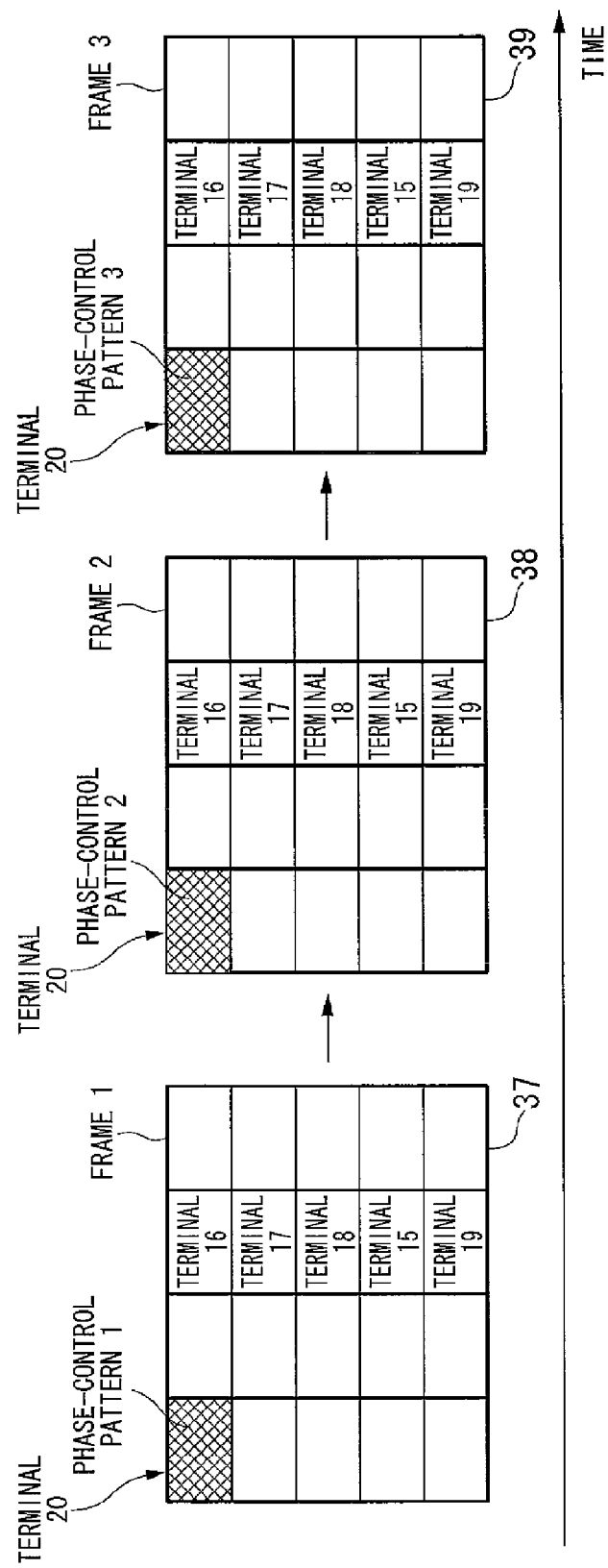
FIG. 37 is an explanatory diagram of a method of measuring multi-user diversity effect when each phase-control pattern is executed in frames equivalent to the number of phase-control patterns.

In FIG. 37, (a) to (c) shows explanatory diagrams of a method of measuring multi-user diversity effect when each phase-control pattern is executed in frames equivalent to the number of phase-control patterns. In this example, the number of phase-control pattern is three. In FIG. 37, as shown in (a) to (c), terminals 15 to 19 are assigned to K5, K3, K7, K11, and K19 respectively. Each frame includes chunks arranged in the frequency direction and in the time direction, the frames being transmitted in the order of a first frame 37 (FIG. 37 (a)), a second frame 38 (FIG. 37 (b)), and a third frame 39 (FIG. 37 (c)). For example, the first frame 37 uses a phase-control pattern 1 shown in FIG. 26 for phase-control, the second frame 38 uses phase-control pattern 2, and the third frame 39 uses phase-control pattern 3. The terminal (terminal 20 in FIG. 37) measures the reception quality of the multi-user diversity effect using each phase-control pattern in the assigned chunks, and reports them to the base station apparatus 11. Of the reception qualities reported from the terminal, the base station apparatus 11 performs communication from the subsequent frame using the phase-control pattern having the best reception quality, and uses the MCS information of the multi-user diversity effect when that phase-control pattern is used. In this method, since only assigned chunks are measured, special pilot arrangement information is not required.

Figure 38:
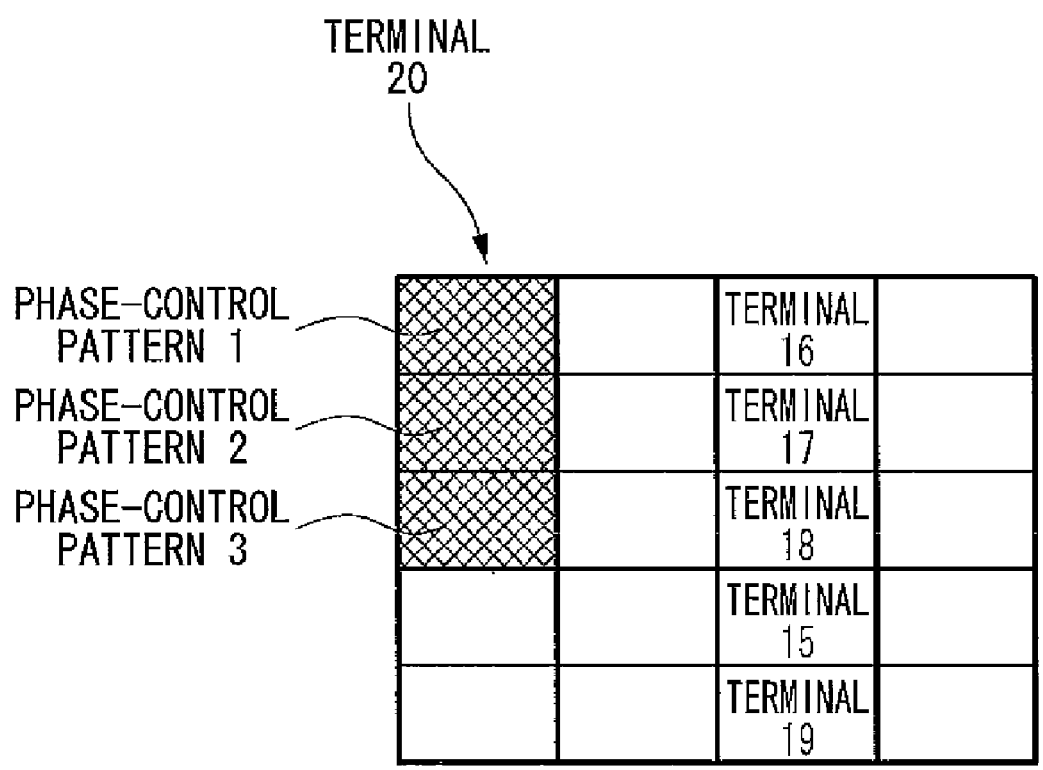
FIG. 38 is an explanatory diagram of a method whereby the terminal 20 (FIG. 37) measures reception quality using a plurality of chunks belonging to a frequency band of assigned chunks.

FIG. 38 is an explanatory diagram of a method whereby the terminal 20 (FIG. 37) measures reception quality using a plurality of chunks belonging to a frequency band of assigned chunks. This method measures the multi-user diversity effect of each phase-control pattern in each chunk. The common pilot channels for measuring the reception quality of the phase-control patterns are arranged as shown in FIG. 38. The terminal measures the reception quality of the multi-user diversity effect using each phase-control pattern by measuring the common pilot channel of each chunk; the base station apparatus 11 selects the phase-control pattern and the MCS information which have the best reception quality, and uses them from the next transmission.

In the wireless transmitter according to this embodiment, the MAC unit 221 (transmission circuit controller) assigns a common pilot channel for measuring the reception quality of the phase-control pattern to a plurality of chunks in one frame, sets the plurality of chunks such that they extend over a plurality of frames 37 to 39 (FIG. 37), assigns common pilot channels, and so on.

In FIG. 37 and FIG. 38, MCS information obtained by measuring the reception quality of phase-control patterns for a plurality of chunks and a plurality of frames is determined; as one example of a method of determining this MCS information, while measuring the MCS information of a phase-control pattern, MCS information of a frequency band having good reception quality when the base station apparatus 11 assigns a terminal is used.

However, when transmission based on good-quality MCS information continues, since the communication reliability is unknown, transmission can be made using MCS information that lies between good-quality MCS information and poor-quality MCS information. Also, in the method of measuring MCS information described above, the MCS information can be updated in every frame. In this method of updating the MCS information in every frame, every time MCS information relating to each phase-control pattern is reported, the best MCS information can be selected from the reported MCS information, and transmitted.

Figure 39:
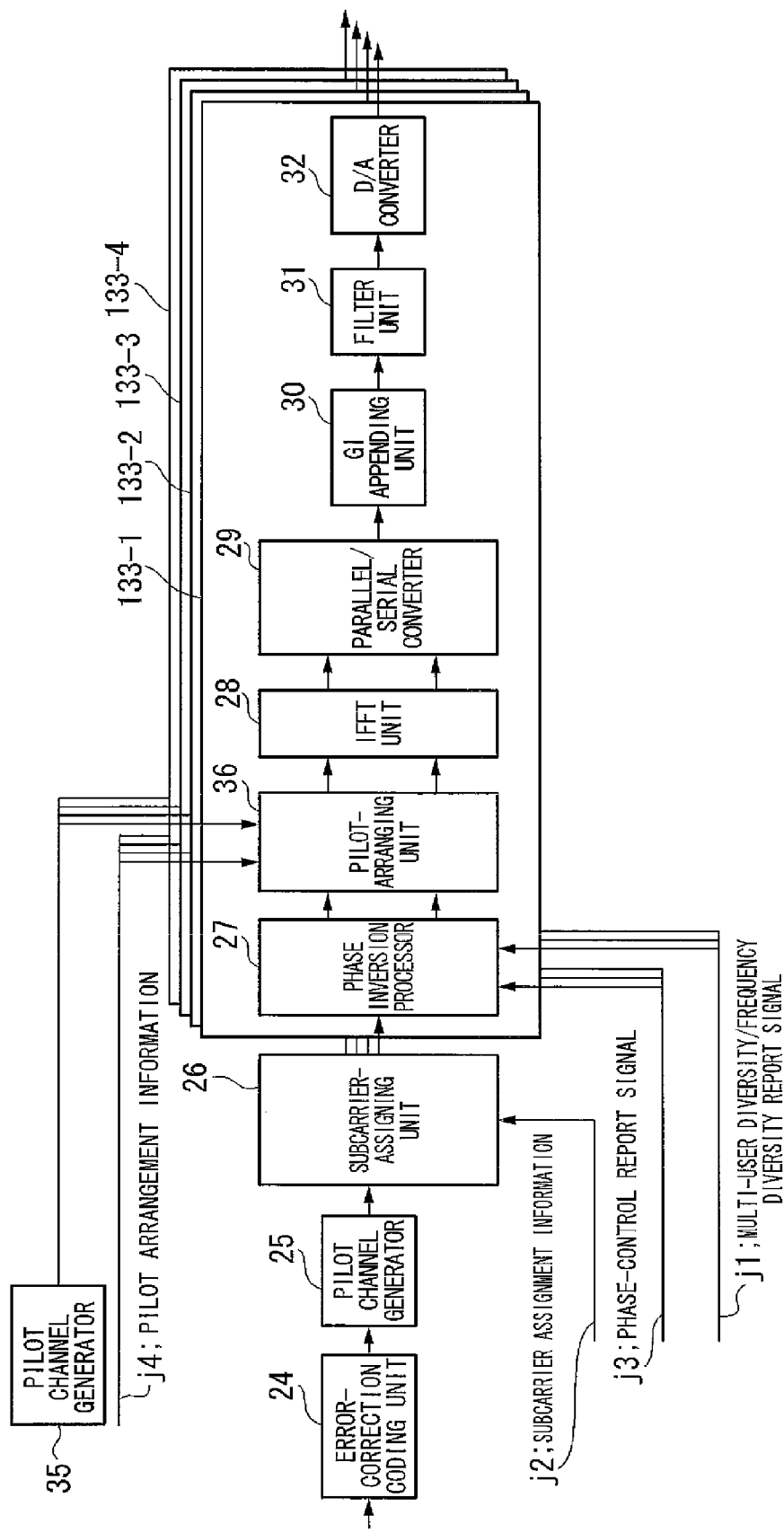
FIG. 39 is a block diagram of the configuration of the transmission circuit unit 22 (FIG. 33) according to the fourth embodiment of the invention.
Figure 40:
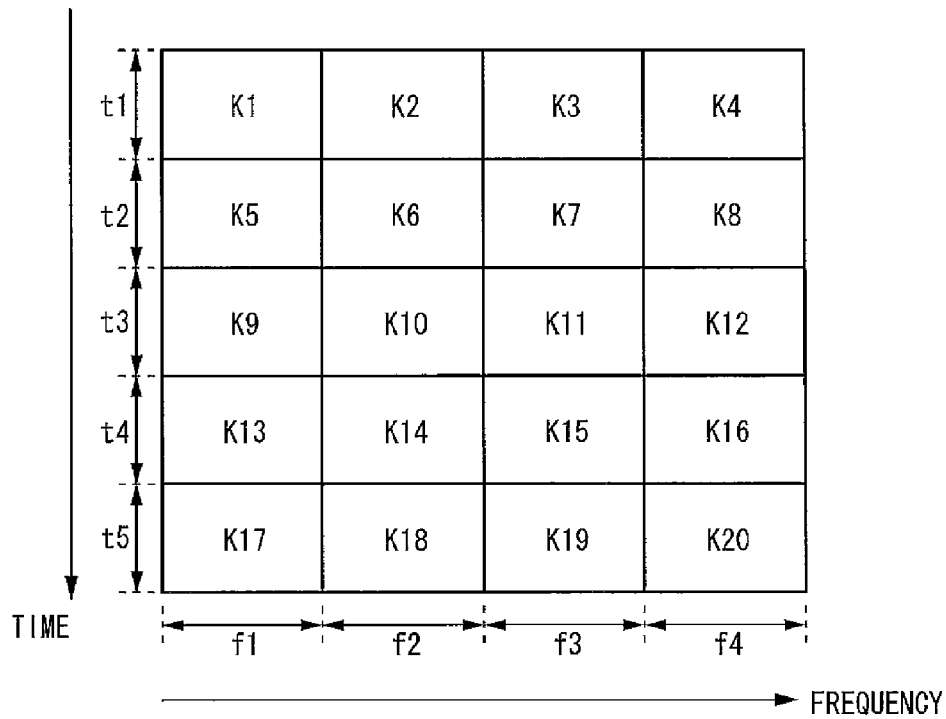
FIG. 40 is a diagram of the relationship between time (vertical axis) and frequency (horizontal axis) of a signal transmitted from a wireless transmitter to a wireless receiver.
Figure 41:
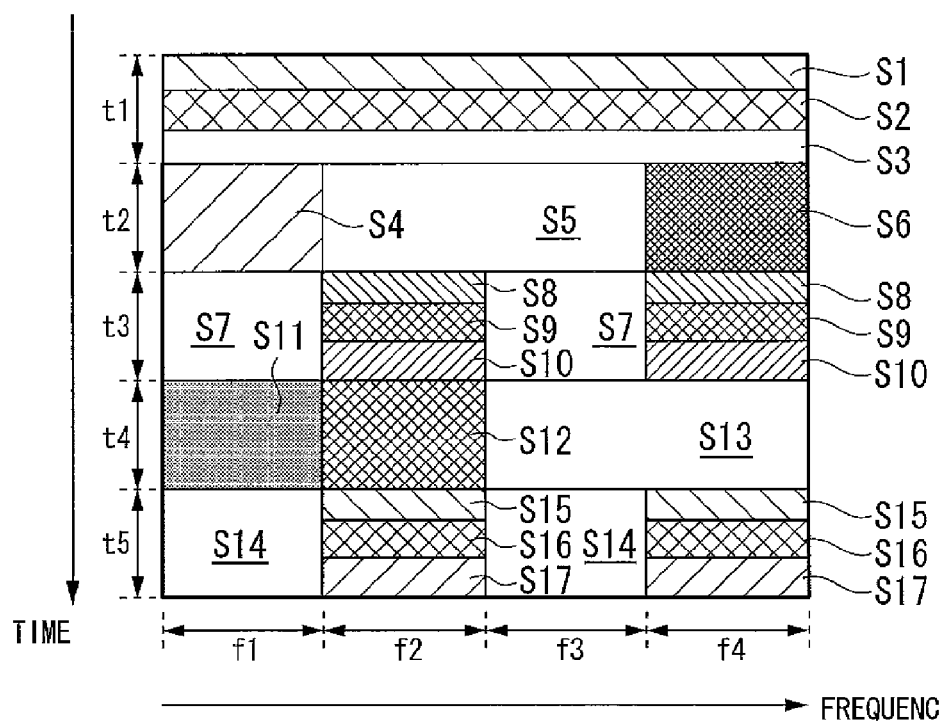
FIG. 41 is a diagram of the relationship between time (vertical axis) and frequency (horizontal axis) of a signal transmitted from a wireless transmitter to a wireless receiver.

FIG. 39 is a block diagram of the configuration of the transmission circuit unit 22 (FIG. 33) according to the fourth embodiment of the invention. Based on subcarrier assignment information j2, a subcarrier-assigning unit 26 supplies the output of a modulator 25 to each subcarrier. The subcarrier-assigning unit 26 outputs to transmission antenna circuits 331-1, 2, 3, and 4, which generate signals to be transmitted from transmission antennas. Since there are four transmission antennas in this example, in FIG. 39, four transmission antenna circuits 133-1, 2, 3, and 4 are provided. In each transmission antenna circuit unit, a phase inversion processor 27 controls delay time difference and performs phase-control for each transmission antenna, based on a multi-user diversity/frequency diversity report signal j1 and a phase-control report signal j3. Based on the pilot arrangement information j4, a pilot-arranging unit 36 arranges common pilot channels generated by a pilot channel generator 35 in regions r1 to r10 of chunks as described in FIG. 8 with respect to the output of the phase inversion processor 27, and outputs to an IFFT unit 28. A delay time difference for each transmission antenna corresponding to a multi-user diversity effect is appended to the common pilot channels generated by the pilot channel generator 35, and each phase-control pattern is subjected to phase-control. The output of the pilot-arranging unit 36 is processed by the IFFT unit 28, the parallel/serial converter 29, the GI appending unit 30, the filter unit 31, and the D/A converter 32.

According to the wireless transmitter of the fourth embodiment, MCS information for all phase-control patterns is measured, and phase-control pattern among them having the best MCS information is then used in performing communication between the wireless transmitter and the terminal, whereby the communication quality can be enhanced.

Incidentally, in the embodiments described above, a program for implemented some or all of the functions of the receive circuit unit 20a, the MAC unit 21, the transmission circuit unit 22, the wireless frequency converter 23, the error-correction coding unit 24, the modulator 25, the subcarrier-assigning unit 26, the phase inversion processor 27, the IFFT unit 28, the parallel/serial converter 29, the GI appending unit 30, the filter unit 31, the D/A converter 32, the transmission antenna circuits 33-1, 2, and 3, the scheduling units 34, 134, 234, and 334, the pilot channel generator 35, and the pilot-arranging unit 36 in FIGS. 19, 20, 23, 29, 31, 33, 33, and so on, can be stored on a computer-readable recording medium; a computer system is made to read and execute the program stored on the recording medium, whereby the wireless transmitter is controlled. Here, 'computer system' include hardware such as OS and peripheral devices.

'Computer-readable recording medium' includes portable media such as a flexible disk, an optical-magnetic disk, a ROM, a CD-ROM, and storage devices such as hardware contained in the computer system. Moreover, 'computer-readable recording medium' also includes media that dynamically store a program for a short period of time, such as a communication line when transmitting the program via a network such as the internet and a communication cable such as a telephone line, and media that store the program for a fixed time, such as a volatile memory internally provided in computer systems that functions as server and clients in such a case. The program can implement only some of the functions mentioned above, or implement a combination of those functions and other programs already stored in the computer system.

While preferred embodiments of the invention have been described and illustrated above, the specific configuration is not limited to these embodiments, and include other designs and the like which are made without departing from the spirit or scope of the present invention.

INDUSTRIAL APPLICABILITY

The present invention can be applied in a wireless transmitter and a wireless transmission method, more particularly in a wireless transmitter and a wireless transmission method where signals are transmitted from a wireless transmitter including a plurality of transmission antennas to a terminal and can increase the reception quality of signals received by a terminal from the wireless transmitter

The invention claimed is:

1. A wireless transmitter comprising:
a plurality of transmission antennas;
a transmission circuit controller that, based on reception qualities reported from terminals, assigns a communication frequency band and a communication time in a frame to each terminal, and sends a phase-control report signal that determines whether to perform phase-control; and
a transmission circuit unit that, at said communication frequency and communication time, applies a delay difference between at least two transmission antennas among said plurality of transmission antennas which diversity is to be given to, and performs phase-control based on said phase-control report signal.

2. The wireless transmitter according to claim 1, wherein said transmission circuit controller sends a multi-user diversity/frequency diversity report signal that determines, for each communication frequency band and communication time, whether to make it a multi-user diversity region or a frequency diversity region, to the transmission circuit unit; and
said transmission circuit unit applies a different delay to each of said plurality of transmission antenna, based on said multi-user diversity/frequency diversity report signal.

3. The wireless transmitter according to claim 1, wherein said transmission circuit controller, in assigning a communication frequency band having poor reception quality to a terminal, sends a phase-control report signal which determines that phase-control is to be performed.

4. The wireless transmitter according to claim 3, wherein said transmission circuit controller sets, as said frequency band having poor reception quality, a frequency band other than one having the best reception quality.

5. The wireless transmitter according to claim 3, wherein said transmission circuit controller sets, as said frequency band having poor reception quality, a frequency band having a reception quality that is no greater than a predetermined threshold, determined based on reception quality in a frequency band having the best reception quality.

6. The wireless transmitter according to claim 5, wherein said transmission circuit controller uses at least one of MCS, SINR, and received power as said reception quality.

7. The wireless transmitter according to claim 5, wherein said transmission circuit controller sets said predetermined threshold at one-half of the reception quality in the frequency band having the best reception quality.

8. The wireless transmitter according to claim 3, wherein, when assigning a frequency band having poor reception quality to a terminal, said transmission circuit controller assigns a plurality of communication frequency bands and communication times to that terminal.

9. The wireless transmitter according to claim 1, further comprising a transmission antenna circuit unit that, when said phase-control report signal reports that phase-control is to be performed, performs phase-control of at least one of said plurality of transmission antennas.

10. The wireless transmitter according to claim 9, wherein, when said phase-control report signal reports that phase-control is to be performed, said transmission antenna circuit unit performs phase-control of one of said plurality of transmission antennas.

11. The wireless transmitter according to claim 1, wherein said transmission circuit controller sends pilot arrangement information, which relates to an arrangement of pilot channels, and said phase-control report signal to said transmission circuit unit, re-receives the reception quality of the terminal for which the phase-control report signal reported that phase-control is to be performed, and, based on said pilot arrangement information, assigns a pilot channel.

12. The wireless transmitter according to claim 11, wherein said transmission circuit controller assigns a pilot channel for propagation path estimation at a plurality of communication frequency bands and communication times, reports the fact that said pilot channel is one of least one phase-control patterns to the transmission circuit unit, and transmits said pilot channel.

13. The wireless transmitter according to claim 12, wherein said transmission circuit controller sets said plurality of communication frequency bands and communication times such that they extend over a plurality of frames.

14. The wireless transmitter according to claim 12, wherein said transmission circuit controller sets the number of communication frequency bands and communication times, and the number of frames, at the number of phase-control patterns.

15. The wireless transmitter according to claim 11, wherein, based on the reception quality transmitted from the terminal, said transmission circuit controller compares the reception qualities of the phase-control patterns, and selects a phase-control pattern having the best reception quality.

16. The wireless transmitter according to claim 12, wherein said plurality of transmission antennas includes a first transmission antenna, a second transmission antenna, a third transmission antenna, and a fourth transmission antenna;
there are three phase-control patterns; and
said transmission circuit controller performs phase-control of two transmission antennas from among said first transmission antenna to said fourth transmission antenna.

17. The wireless transmitter according to claim 1, wherein said transmission circuit unit rotates the phase of a transmission antenna for phase-control by $\pi$.

18. A wireless transmitter comprising:
a plurality of transmission antennas; and
the wireless transmitter assigning, based on reception qualities reported from terminals, a communication frequency band and a communication time in a frame to each terminal, at said communication frequency and communication time, applying a delay difference between at least two transmission antennas among the plurality of transmission antennas which diversity is to be given to, and selecting a phase-control amount for phase-control.

19. The wireless transmitter according to claim 18, wherein 0 or $\pi$ is selected as said phase-control amount.

20. The wireless transmitter according to claim 18, wherein the delay applied to each of said plurality of transmission antennas is selected based on a multi-user diversity/frequency diversity report signal that determines, for each communication frequency band and communication time, whether to make it a multi-user diversity region or a frequency diversity region.

21. A wireless transmission method for executing:
a first step of assigning, based on reception qualities reported from terminals, communication frequency band and a communication time in a frame, and sending a phase-control report signal that determines whether to perform phase-control, to each terminal; and
a second step of applying, at said communication frequency and communication time, a delay difference between at least two transmission antennas among a plurality of transmission antennas which diversity is to be given to, and performing phase-control based on said phase-control report signal.

* * * * *